(12) United States Patent
Uchida et al.

(10) Patent No.: US 7,575,410 B2
(45) Date of Patent: Aug. 18, 2009

(54) ELECTRIC AIR PUMP APPARATUS AND EVAPORATION FUEL TREATMENT SYSTEM

(75) Inventors: Akikazu Uchida, Kariya (JP); Hiroshi Nakamura, Nishio (JP); Kunihiro Tsuzuki, Obu (JP); Shinichi Yokoyama, Gifu (JP); Yasunori Kobayashi, Toyohashi (JP)

(73) Assignee: Denso Corporation, Kariya (JP)

( * ) Notice: Subject to any disclaimer, the term of this patent is extended or adjusted under 35 U.S.C. 154(b) by 328 days.

(21) Appl. No.: 11/392,526

(22) Filed: Mar. 30, 2006

(65) Prior Publication Data

US 2006/0219231 A1 Oct. 5, 2006

(30) Foreign Application Priority Data

Apr. 1, 2005 (JP) ............................. 2005-106488

(51) Int. Cl.
*F03B 15/08* (2006.01)
(52) U.S. Cl. ...................... 415/36; 137/56; 123/520
(58) Field of Classification Search .................. 415/36, 415/42, 46; 123/520; 137/50, 53
See application file for complete search history.

(56) References Cited

U.S. PATENT DOCUMENTS

| | | | | |
|---|---|---|---|---|
| 2,615,462 A | * | 10/1952 | Crowder | 137/56 |
| 3,697,189 A | * | 10/1972 | Tibbott | 415/36 |
| 3,740,174 A | * | 6/1973 | Amtsberg | 418/43 |
| 4,188,780 A | * | 2/1980 | Penny | 60/39.281 |
| 5,234,014 A | * | 8/1993 | Queitzsch, Jr. | 137/56 |
| 5,868,120 A | * | 2/1999 | Van Wetten et al. | 123/518 |
| 6,179,552 B1 | * | 1/2001 | Jacobsson | 415/25 |
| 6,257,209 B1 | * | 7/2001 | Hyodo et al. | 123/520 |
| 6,857,515 B2 | * | 2/2005 | Barron et al. | 192/105 BA |
| 6,910,467 B2 | * | 6/2005 | Murakami et al. | 123/520 |
| 7,047,951 B2 | * | 5/2006 | Rado | 123/518 |
| 2003/0130044 A1 | * | 7/2003 | Kanai et al. | 464/32 |
| 2004/0211855 A1 | * | 10/2004 | Shibukawa et al. | 242/355 |

FOREIGN PATENT DOCUMENTS

| | | |
|---|---|---|
| JP | 7-158429 | 6/1995 |
| JP | 11-81998 | 3/1999 |

* cited by examiner

*Primary Examiner*—Stephen K Cronin
*Assistant Examiner*—Sizo B Vilakazi
(74) *Attorney, Agent, or Firm*—Nixon & Vanderhye, PC

(57) ABSTRACT

A self-opened type valve is opened by motor torque of an electric motor. Therefore, a diaphragm is not necessary for opening the valve, and downsizing of a valve drive apparatus for opening the valve is possible. Since the valve is assembled to the motor shaft of the electric air pump via a motion-direction conversion mechanism, an opening action of the valve can start in a short time after a rotational action of the impeller of the electric air pump starts, so that control responsiveness is improved. At a rotation stop of the impeller of the electric air pump, the valve can be maintained in a fully closed condition by an urging force of the coil spring, thereby preventing exhaust gases or condensed water from entering into an inside of the electric air pump.

5 Claims, 24 Drawing Sheets

ELECTRIC AIR PUMP APPARATUS AND EVAPORATION FUEL TREATMENT SYSTEM

CROSS-REFERENCE TO RELATED APPLICATION

This application is based on Japanese Patent Application No. 2005-106488 filed on Apr. 1, 2005, the disclosure of which is incorporated herein by reference.

FIELD OF THE INVENTION

The present invention relates to an electric air pump apparatus formed of a pump unit equipped with at least an electric air pump and a self-opened air switching valve including a movement direction-changing mechanism and a flow path opening valve. In particular the present invention relates to an electric air pump apparatus incorporated in a secondary air supply system or an evaporation fuel treatment system.

BACKGROUND OF THE INVENTION

FIG. 25A shows a known secondary air supply system. This secondary air supply apparatus is designed to activate a three-way catalyst by introducing secondary air generated by operating an electric air pump 201 at the time of starting an internal combustion engine into a three-way catalyst converter (not shown) via a secondary airflow manifold and an engine exhaust manifold 202. In addition, a combination valve 203 formed of a lead valve having a non-return valve function and a diaphragm type flow opening valve is provided in the halfway of the secondary flow manifold for introducing secondary air pressurized and supplied from the electric air pump 201 into the engine exhaust manifold 202 (for example, JP-7-158429A).

The secondary air supply apparatus is provided with a failure diagnosis function for diagnosing a failure of the electric air pump 201 and is designed to determine that the electric air pump is abnormal when the secondary air pressure detected by a pressure sensor 204 is out of a predetermined pressure range. The above combination valve 203 is provided with the lead valve and the flow opening valve formed integrally, which is different from the conventional secondary air supply apparatus. This arrangement causes downsizing of valve parts and reduction in manufacturing costs, and further makes possible prevention of corrosion or deposition of deposits in the secondary airflow manifold due to accumulation of an exhaust gas, flocculated water or the like therein. A diaphragm for opening and driving the flow opening valve, as shown in FIG. 25A, is operated by means of negative pressures via a vacuum switch valve 205.

A secondary air supply apparatus is proposed in consideration of both not only the conventional use in the level ground but also use in the upland region having low atmospheric pressures. This secondary air supply system is provided with a self-opening type flow opening valve (air switching valve) 206, as shown in FIG. 25B, for opening and driving a valve body by means of discharge pressures of the electric air pump 201 as a flow opening valve usable in both the uses (for example, JP-11-081998A). The electric air pump 201 is disposed in an upstream side of the flow opening valve 206 in the secondary airflow direction to be driven by receiving power from an in-vehicle battery for providing a desired secondary air pressure to the flow opening valve 206. The electric air pump 201 is designed to be controlled by an electrically controlled unit (ECU) via a relay for air pump control.

When a secondary air supply system is, however, used in the upland region under low atmospheric pressures, a secondary air supply system described in JP-7-158429A can not provide sufficient negative pressures necessary for operating a diaphragm which drives a valve body of the flow opening valve in the combination valve 203. In addition, in a secondary air supply system described in JP-11-081998A, the electric air pump 201 is located at a relatively distant position from the flow opening valve 206 the valve body of which opens by means of discharge pressures of the electric air pump 201 and therefore, the control responsiveness of the valve body of the flow opening valve 206 is not sufficient in view of a system function.

FIG. 26 shows a known evaporation fuel treatment system in which evaporation fuel evaporated in a fuel tank 211 for a vehicle such as an automobile is purged into an engine intake manifold 214 via a canister 212 and a purge vacuum switching valve 213 by means of intake manifold vacuum, thus preventing fluid such as the evaporation fuel from being discharged into an atmosphere. A throttle valve 215 is disposed in the intake manifold 214 and a normally-opening type canister control valve 216 is connected to the canister 212. Recently an intake manifold vacuum is likely to reduce in an internal combustion engine mounted in a hybrid car or a cylinder control type internal combustion engine. In this case, since the evaporation fuel is not sufficiently purged, there is provided a method of forcibly purging the evaporation fuel by an electric air pump. This method requires a flow opening valve for preventing leakage of fluid such as evaporation fuel at the time of ceasing the electric air pump, thereby deteriorating mount-properties to an engine room for a vehicle.

In view of the above, there exists a need for an electric air pump apparatus and an evaporation fuel treatment system which overcome the above mentioned problems in the conventional art. The present invention addresses this need in the conventional art as well as other needs, which will become apparent to those skilled in the art from this disclosure.

SUMMARY OF THE INVENTION

An object of the present invention is to provide an electric air pump and an evaporation fuel treatment system, which can perform downsizing of a valve drive part for opening/closing a flow opening valve. Another object of the present invention is to provide an electric air pump and an evaporation fuel treatment apparatus, which can improve control responsiveness of a flow opening valve.

According to an aspect of the present invention, when an electric air pump performs a rotary motion, an air stream occurs in an airflow path communicated with an internal combustion engine. Further, the rotary motion of the electric air pump is converted to a linear motion or a swing movement by a motion-direction conversion mechanism. A flow opening valve is opened/closed by the linear motion or the swing movement of the motion-direction conversion mechanism and therefore, an airflow path in an airflow pipe is opened/closed. That is, the motion-direction conversion mechanism interposed between the electric air pump and the flow opening valve converts the rotary motion of the electric air pump into the linear motion or the swing movement to open/close the flow opening valve. Herein, when the flow opening valve is opened due to the rotary motion of the electric air pump, an air stream occurs inside the electric air pump and in the airflow path of the airflow pipe. When the flow opening valve is closed due to the rotary motion of the electric air pump, an air stream occurs only inside the electric air pump.

Thus, since the flow opening valve can be opened/closed by use of the rotary motion of the electric air pump (for example, motor torque of a motor shaft for rotating and driving a pump impeller), downsizing of the valve drive parts for opening/closing the flow opening valve can be made. In addition, the flow opening valve can start opening/closing movement within a short time after the electric air pump starts to operate, thus improving control responsiveness of the flow opening valve. Further, at least the electric air pump (an air pump and a motor), the motion-direction conversion mechanism and the flow opening valve may be integrally provided inside a housing connected air-tightly to the airflow pipe. In this case, a pump case and a valve case are integrally formed, in a side of which an airflow path (valve chamber) communicated with an air path of the airflow pipe and a pump chamber communicated with the airflow path are provided.

BRIEF DESCRIPTION OF THE DRAWINGS

Other objects, features, and advantages of the present invention will become more apparent from the following detailed description made with reference to the accompanying drawings, in which like parts are designated by like reference numbers and in which.

DETAILED DESCRIPTION OF THE PREFERRED EMBODIMENTS

The following description of a preferred embodiment of the present invention is merely exemplary in nature and is in no way intended to limit the present invention, its application, or uses.

First Embodiment

Figure 1:
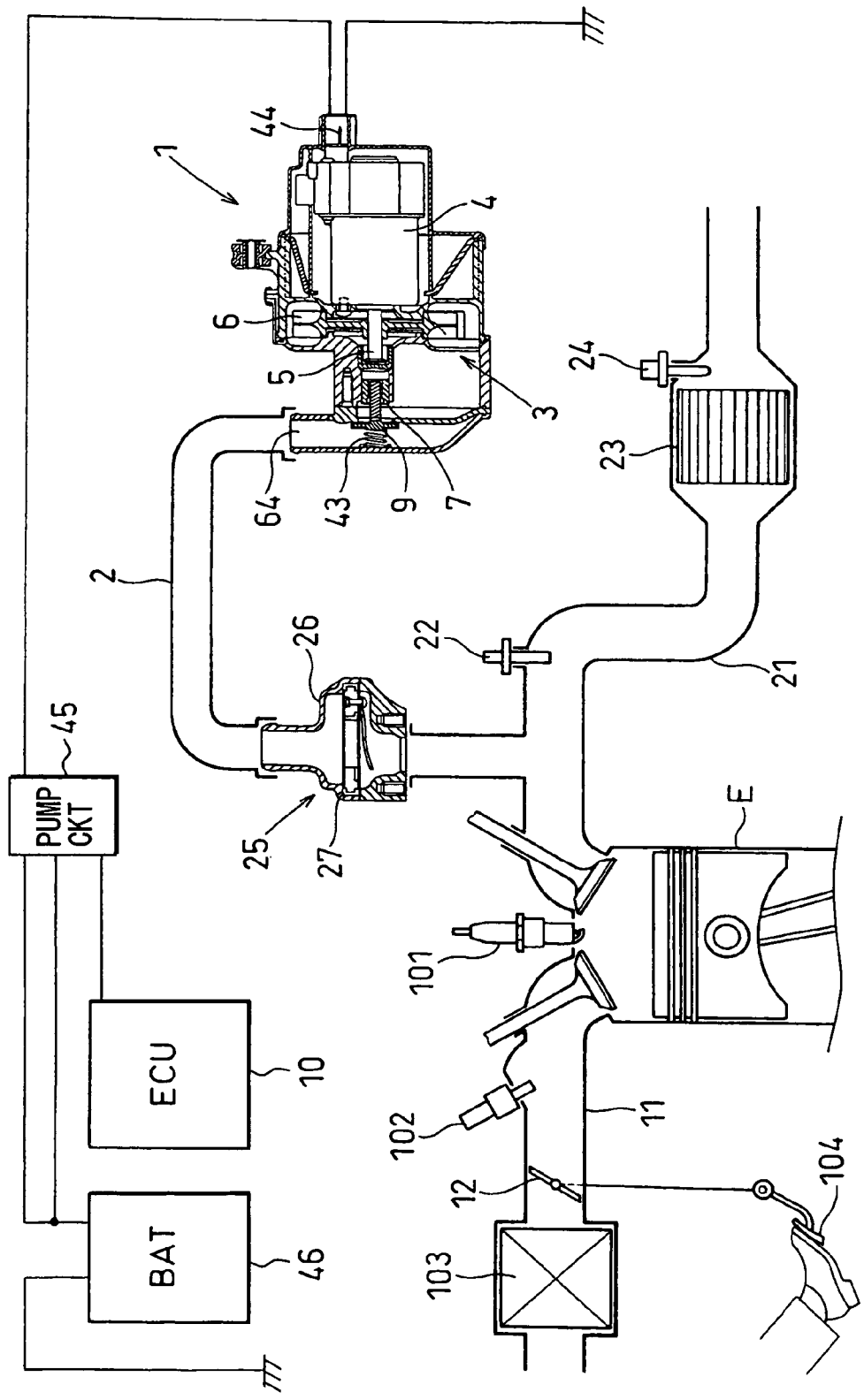
FIG. 1 is a schematic diagram showing an entire arrangement of a secondary air supply system in a first embodiment of the present invention.
Figure 2:
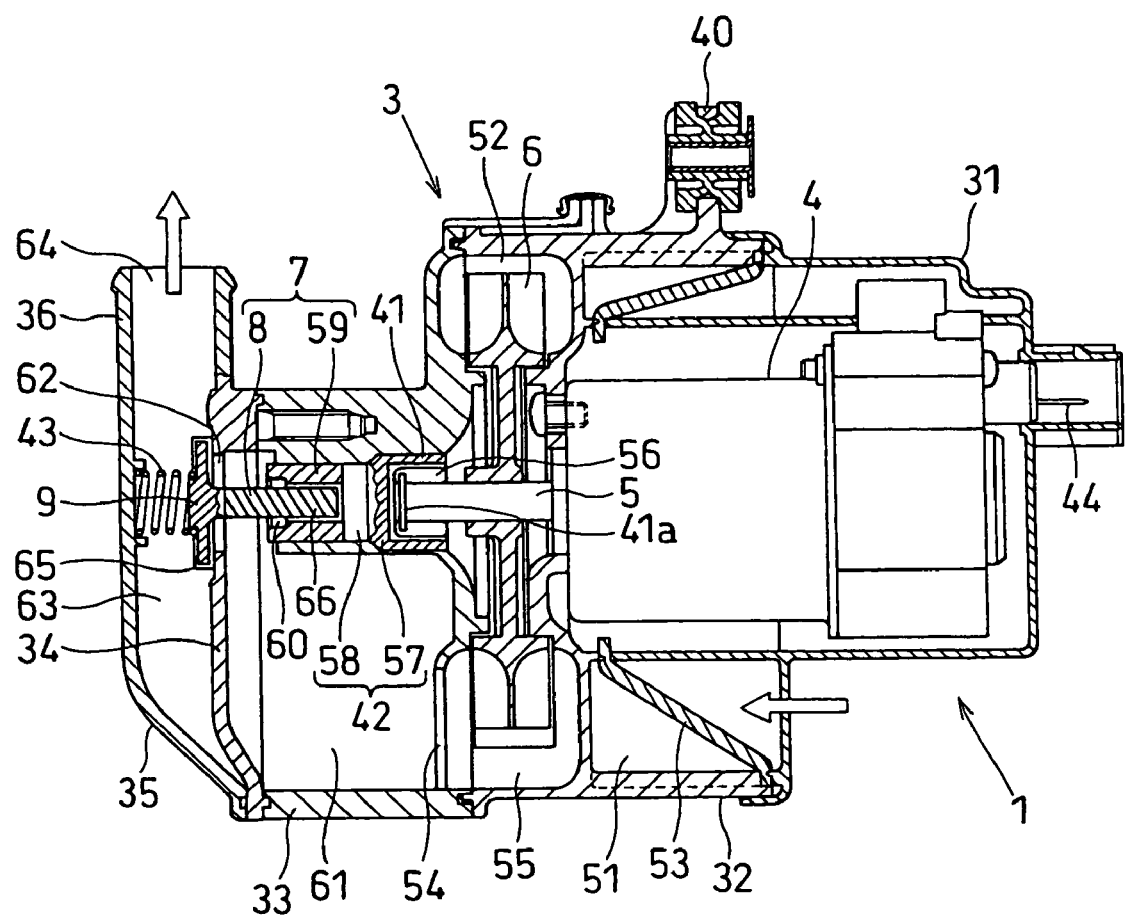
FIG. 2 is a cross section showing an entire arrangement of an electric air pump unit in a first embodiment of the present invention.

Referring to FIGS. 1 and 2, a secondary air supply system is mounted in an engine room for a vehicle such as an automobile and is provided with an electric air pump unit 1. The secondary air supply system introduces secondary air generated in a secondary airflow pipe (airflow pipe) 2 at the time of starting an internal combustion engine (engine) E such as a gasoline engine into a three-way catalyst converter 23 to promote warming-up of the three-way catalyst.

The engine E produces a power output by heat energy obtained by burning a mixture of intake air and fuel in a combustion chamber. The engine E is provided with a cylinder block slidably supporting a piston and a cylinder head including an intake port connected to a downstream end of an engine intake pipe 11 including an intake manifold and an exhaust port connected to an upstream end of an engine exhaust pipe 21 including an exhaust manifold. The intake port and the exhaust port each are opened/closed by an intake valve and an exhaust valve. A spark plug 101 is attached in the cylinder head in such a way that a front end of the spark plug 101 is exposed to the combustion chamber. In addition, an electro-magnetic fuel injector 102 is attached in the cylinder head for injecting fuel toward a wall surface of the intake port or a rear wall surface of the intake valve.

An intake passage communicated with the combustion chamber of the engine E via the intake port is formed in the engine intake pipe 11. Intake air aspired into the combustion chamber of the engine E flows inside the intake passage. An air cleaner 103 for filtering the intake air and a throttle valve 12 to be opened/closed in response to a depressing amount (accelerator position) of an accelerator pedal 12 are received in the intake pipe 11. In addition, an exhaust passage communicated with the combustion chamber of the engine E via the exhaust port is formed in the engine exhaust pipe 21. An exhaust gas flown out of the combustion chamber of the engine E flows in the engine exhaust pipe 21 toward the three-way catalyst converter 23. An oxygen sensor 22 for detecting an oxygen density of the exhaust gas, a catalyst temperature sensor 24 for detecting a temperature of the three-way catalyst, an exhaust gas temperature and the like are provided in the engine exhaust pipe 21.

The secondary air supply system in the first embodiment is provided with the electric air pump unit 1, the secondary airflow pipe 2 connected to the engine exhaust pipe 21 communicated with the combustion chamber of the engine E, a check valve 25 for preventing reverse flow of the exhaust gas from a joining part (exhaust manifold) of the secondary airflow pipe 2 and the engine exhaust pipe 21 to an electric air pump side, and an engine control unit (pump control unit: ECU) for electrically controlling the electric air pump unit 1. The electric air pump unit 1 in the first embodiment is an electric air pump module in which an electric air pump 3 for generating a secondary air stream in the secondary airflow pipe 2 is formed integrally with the self-opening type air switching valve (flow opening valve: valve) 9 to be opened due to rotary motion of the electric air pump 3.

The secondary airflow pipe 2 includes a secondary air path formed therein for introducing secondary air pressurized and supplied by the electric air pump 3 into the three-way catalyst converter 23 via the engine exhaust pipe 21. The check valve 25 includes a thin-film lead valve to be opened by pressures of the secondary air discharged from the electric air pump 3. The lead valve had one end fixed to a metal plate 27 retained by a valve housing 26 formed of a housing and a valve case. The metal plate 27 includes an air-passing opening (valve bore) formed therein for communicating between the secondary air paths.

Next, an arrangement of the electric air pump unit 1 in the first embodiment will be briefly explained with reference to FIGS. 1 and 2. FIG. 2 is a block diagram showing the electric air pump unit 1.

The electric air pump 3 is a double-vane vortex pump and is formed of an electric motor 4 operated by electric power, a pump impeller (air pump body: hereinafter, referred to as an impeller) 6 rotated by rotary motion of a motor shaft 5 of the electric motor 4 and the like. A valve drive apparatus (valve drive part) for opening (closing) the valve 9 is formed of at least the electric motor 4, a motion-direction conversion mechanism 7 for converting the rotary motion of the motor shaft 5 of the electric motor 4 into a linear motion and the like.

The electric air pump unit 1 is covered with a housing formed of five cases (first case 31 to fifth case 35 from the right side in FIG. 2) in which components are incorporated. The first case 31 to the fifth case 35 are fastened by a fastening screw, a clip, an engagement piece or the like. The first case 31 includes a motor receiving bore for receiving the electric motor 4. The first case 31 to the third case 33 constitute a pump housing for receiving the electric air pump 3. The fourth case 34 to the fifth case 35 constitute a valve housing for receiving the valve 9. The first case 31 includes an outer diameter-side cylindrical part and an inner diameter-side cylindrical part defining an air duct (to be described later) with the outer diameter-side cylindrical part. The inner diameter-side cylindrical part may be used as a motor housing of the electric motor 4.

A stay 40 for mount is disposed in an outer periphery of the second case 32 for retaining a collar and a grommet. The stay 40 for mount of the second case 32 is clamped and fixed to a stationary member disposed in an engine room of a vehicle such as an automobile by a fastening bolt or the like. A centrifugal clutch 41 and a torque limiter 42 are connected between the motor shaft 5 and the motion-direction conversion mechanism 7. A coil spring 43 is attached to the valve 9 to serve as valve-urging means for urging the valve 9 toward a closing direction. The electric motor 4, the centrifugal clutch 41, the torque limiter 42, the motion-direction conversion mechanism 7, the valve shaft 8 and the valve 9 are arranged on a rotational center axis line (on the same axis) of the motor shaft 5.

A DC motor is used as the electric motor 4. The electric motor 4 is a brushless DC motor formed of a rotor integral with the motor shaft 5 disposed extending in one side of the rotational shaft direction (center axis direction of the motor shaft 5 of the electric motor 4: hereinafter, referred to as an axial direction) from the front end surface of the motor housing and a stator located as opposed to an outer periphery of the rotor. The rotor is provided with a rotor core including a permanent magnet and the stator is provided with a stator core on which an armature coil (armature wire) winds. However, a DC motor with brush or an AC motor such as a three-phase induction motor may be used instead of the brushless DC motor.

A terminal (external connection terminal, motor power supply terminal) 44 connected electrically to the armature coil is retained in a pump connector disposed as extending in the other side of the axial direction from the rear end surface of the motor housing. The electric motor 4 is retained in the motor receiving bore of the first case 31 and a front end surface of the motor housing is clamped and fixed to the second case 32 by a fastening screw or the like. The terminal 44 of the electric motor 4 is connected electrically to the battery 46 mounted in the vehicle via a pump drive circuit (mechanical relay) 45. In addition, the pump drive circuit 45 is formed of a relay coil controlled by the ECU 10 for power supply and a relay switch which is opened/closed by magnetomotive force of the relay coil to have or cut off connection between the battery 46 and the terminal 44 of the electric motor 4.

The ECU 10 is provided with a known microcomputer, which is arranged to include functions of a CPU for carrying out control processing and calculating processing, a memory unit (memory such as a ROM or a RAM) for storing various programs and data and the like. The ECU 10 is a pump control unit in which when an ignition switch is ON, supply power supplied to the electric motor 4 is adjusted based upon the control program stored in the memory, thereby controlling a rotary motion (for example, rotational speed or rotational direction) of the motor shaft 5. The ECU 10 is arranged in such a way that an exhaust gas temperature is detected by an exhaust gas temperature sensor (not shown) at the time of an engine start and when the detected exhaust gas temperature is below a predetermined value, power is supplied to the electric motor 4 to drive the electric air pump 3 and the valve 9.

The impeller 6 is rotatably accommodated inside the pump housing. The pump housing is formed of the second case 32 and the third case 33 and includes a circular pump chamber (electric air pump inside) 52 defined therein. The impeller 6 is a bladed wheel including a plurality of blades and pressurizes air suctioned into the pump chamber 52 for discharge. The impeller 6 is rotatably accommodated in the pump chamber 52 and includes a rotor part in a disc shape (main body), a plurality of blades and a plurality of blade grooves formed alternately by an equal interval in the circumferential direction on the outer periphery of the rotor part. A defining wall is provided between the neighboring blades for defining a groove bottom surface of the blade groove. A side groove in a C-letter shape is formed in a radial outer periphery of the pump chamber 52. The side groove includes a groove bottom surface having a semi circle shape in cross section. Each groove bottom shape of the plural blade grooves is a curvature shape which defines a space in an O-letter shape, a U-letter shape or an oval shape with the side groove of the pump chamber 52.

An air duct (electric air pump inside) 51 is circularly formed in the first case 31 and the second case 32 for supplying air into the pump chamber 52. A filter 53 is located in the air duct 51 for filtering air aspired to the impeller 6. An air suction opening (inlet port: not shown) for suctioning air into the air duct 51 is formed in the first case 31. The filter 53 allows passing of airflow therein from the air suction opening, but traps foreign matters mixed with the air to prevent the foreign matters from entering into the pump chamber 52. A pump suction opening (not shown) is formed in the second case 32 for suctioning air from the air duct 51 into the pump chamber 52. A pump discharge opening 54 is formed in the third case 33 for discharging secondary air from the pump chamber 52. A section plate 55 is provided between the second case 32 and the third case 33 for preventing the air from flowing directly from the pump suction opening to the pump discharge opening 54.

The centrifugal clutch 41 is located between the motor shaft 5 and the motion-direction conversion mechanism 7, and is formed of a column-shaped clutch inner rotating together with the electric air pump 3, a cylindrical clutch outer rotating together with the motion-direction conversion mechanism 7 and a plurality of clutch weights (joining part) 56 pivotally incorporated in the clutch inner via a connecting member (for example, a pin) 41a. The clutch inner is a motor-side clutch member (drive-side clutch member) disposed integrally with one end (front end) of the motor shaft 5 in the axial direction. The clutch outer is a valve-side clutch member (driven-side clutch member) arranged as opposed to an outer periphery surface of the clutch inner and disposed integrally with the other end (rear end) of the torque limiter 42. In addition, the clutch outer has one end closed in an axial direction of the motor shaft 5 and the other end opened in the axial direction of the motor shaft 5. A plurality of clutch weights 56 are removably engaged to engagement grooves formed in the inner periphery surface of the clutch outer. The plurality of the clutch weights 56 are urged toward the inner side (centering direction in reverse to a radial direction) in the radical direction of the motor shaft 5 by a resilient deformable member such as a disc spring (not shown).

The centrifugal clutch 41 transmits motor torque from the motor shaft 5 to the torque limiter 42 and the motion-direction conversion mechanism 7 when a centrifugal force (force exerting on the radial, outer diameter side (radial direction) of the motor shaft 5) exerting on the plurality of the clutch weights 56 is beyond a predetermined value. On the other hand, the centrifugal clutch 41 cuts off transmission of the motor torque from the motor shaft 5 to the torque limiter 42 and the motion-direction conversion mechanism 7 when a centrifugal force exerting on the plurality of the clutch weights 56 is below a predetermined value. That is, the centrifugal clutch 41 is a centrifugal clutch mechanism for performing or cutting off transmission of the motor torque from the motor shaft 5 to the torque limiter 42 and the motion-direction conversion mechanism 7 in accordance with a magnitude of the centrifugal force exerting on the plurality of the clutch weights due to rotary motion of the motor shaft 5. However, the motor-side clutch member (drive-side clutch member) may be used as a clutch outer and the valve-side clutch member (driven-side clutch member) may be used as a clutch inner.

The torque limiter 42 is located between the centrifugal clutch 41 and the motion-direction conversion mechanism 7 and is formed of a surface (circular friction surface) of a closing part (friction plate) of the clutch outer of the centrifugal clutch 41 and a surface (circular friction surface) of a friction surface 58 located co-axially as opposed to the friction plate 57. When the valve 9 is fully opened and therefore, travel thereof toward one side (valve-opening direction) in the axial direction of the valve 9 is restricted, the motion-direction conversion mechanism 7 and also excessive load torque are applied to the torque limiter 42. At this point, the torque limiter 42 serves as a power-cutting off means for cutting off transmission of the motor torque from the friction plate 57 to the friction plate 58. On the other hand, when the excessive load torque is not applied, the torque limiter 42 serves as power transmission means for transmitting the motor torque by friction engagement between the friction plate 57 and the friction plate 58. For an increase of friction engagement force between the friction plate 57 and the friction plate 58, friction plate-urging means such as a coil spring, a leaf spring, a rubber resilient member, an air cushion plate or the like may be disposed for urging the friction plate 57 or the friction plate 58 toward the friction plate 58 or the friction plate 57.

The motion-direction conversion mechanism 7 is a screw mechanism for converting a rotary motion of the motor shaft 5, i.e., a rotary motion of the clutch inner and the clutch outer of the centrifugal clutch 41, and the friction plates 57 and 58 of the torque limiter 42 into a linear motion of the valve 9 in the opening direction. The motion-direction conversion mechanism 7 is formed of a rotor sleeve (rotational tubular screw member) 59 rotating together with the friction plate 58 of the torque limiter 42 and an axis-shaped slider (valve shaft) 8 movably in an axial direction of the motor shaft 5. An inner periphery screw part (female screw) 60 screwed with an outer periphery part (male screw) of the valve shaft 8 is formed on an inner periphery part of one end side (front end side) of the rotor sleeve 59 in an axial direction. In addition, a ball screw mechanism or a rack and pinion mechanism may be used instead of the screw mechanism as the motion-direction conversion mechanism 7.

An airflow path (electric air pump inside) 61 is formed between the third case 33 and the fourth case 34 so as to communicate with the pump chamber 52 via the pump discharge opening 54. An air passing opening (circular valve bore) 62 is formed in the fourth case 34 so as to communicate with the airflow path 61. An airflow path (valve chamber) 63 is formed between the fourth case 34 and the fifth case 35 so as to communicate with the airflow path 61 via the valve bore 62. An outlet side flow pipe 36 connected air-tightly to the secondary airflow pipe 2 is disposed in the fifth case 35 and an air discharge opening (outlet port 64) is formed in the outlet side flow pipe 36 to communicate the airflow path 63 with the secondary airflow path of the secondary airflow pipe 2.

The valve 9 is received in the first case 31 to the fifth case 35 receiving the electric air pump 3 in such a way as to be opened and closed and is located very close to the electric air pump 3. The valve 9 is a poppet type valve for opening/closing the valve bore 62 and is disposed in a collar shape integrally with one end side (front end side) of the valve shaft

8 in an axial direction. The valve shaft 8 is located in such a way as to penetrate through a central part of the valve bore 62. The valve shaft 8 is arranged in such a way that a rotary motion (rotational motion) thereof is restricted by an engagement part (not shown) disposed in an inner periphery part of the fourth case 34 and the fifth case 35. A reciprocal, linear motion thereof is performed in the axial direction (center axis direction of the valve 9: hereinafter, referred to as axial direction) by a rotational action of the rotor sleeve 59. The valve 9 is received in the airflow path 63 in such a way as to move reciprocally and linearly in the axial direction of the motor shaft 5.

The valve 9 is seated at a first circular valve seat disposed in the fourth case 34 at the time of closing the valve 9 to fully close the valve bore 62. The valve 9 is seated at a second circular valve seat disposed in the fifth case 35 at the time of opening the valve 9 to fully open the valve bore 62. A seal rubber 65 is attached on a surface of the valve 9 by baking to air-tightly seal the valve bore 62 at the time when the valve 9 is seated at the first valve seat. An outer periphery screw part 66 threaded with an inner periphery screw part 60 of the rotor sleeve 59 is formed on the outer periphery part of the valve shaft 8. One end of the coil spring 43 in an axial direction is retained by a spring hook (concave groove part) of the fifth case 35 and the other end of the coil spring 43 in the axial direction is retained by a spring hook of a valve body of the valve 9.

Operations of the secondary air supply system in the first embodiment will be briefly explained with reference to FIGS. 1 and 2.

The three-way catalyst converter 23 is mounted in a vehicle for an automobile or the like. The converter 23 converts three elements composed of carbon monoxide (CO), hydrogen carbon (HC) and Nitrogen oxide ($NO_x$), which are considered as toxic substances in the exhaust gas emitted from the combustion chamber of the engine E, into non-toxic substances at the same time by chemical reaction. In particular, the three-way catalyst converter 23 for converting hydrogen carbon (HC) into non-toxic water ($H_2O$) by oxidation is mounted. However, a three-way catalyst does not perform appropriate chemical reaction when a mixture ratio of air and fuel is not a theoretical air-fuel ratio at combustion of the engine E. Accordingly, it is necessary to maintain a mixture ratio at a theoretical air-fuel ratio of 15:1. Further, the three-way catalyst does not operate properly when an exhaust gas temperature is low, for example, immediately after the starting of the engine E (below about 350° C.). Therefore, it is preferable that at the start of the engine E when the exhaust gas temperature is low, electric power is supplied to the electric motor 4 to rotate the impeller 6 by rotational motion of the motor shaft 5. As a result, secondary air generated in the secondary airflow pipe 2 is introduced to the three-way catalyst converter 23 via the engine exhaust gas pipe 21 to promote warming up of the three-way catalyst, thus activating the three-way catalyst.

Accordingly, when an exhaust gas temperature is low, for example, immediately after the starting of the engine E (when an exhaust gas temperature detected by an exhaust gas sensor is lower than a predetermined value or when a temperature of the three-way catalyst detected by a catalyst temperature sensor 24 is lower than a first predetermined value), the ECU 10 supplies electric power (pump drive current) to the electric motor 4 to rotate the motor shaft 5 in the forward direction at a predetermined rotational speed (for example, high-speed rotation). Thereby, the impeller 6 rotates by motor torque (the electric air pump 3 is ON). Accordingly, when air is taken from the inlet port into the air duct 51 and the air passes through the filter 53, foreign matters such as dusts and motes in the air are trapped, which are suctioned from the pump suction opening to the pump chamber 52. A flow speed of the air suctioned into the pump chamber 52 is increased and pressurized by a plurality of blade parts and grooves of the impeller 6 to form a secondary air stream, which is discharged from the pump discharge opening 54 to a side of the secondary airflow path. That is, the air is aspired from the inlet port caused by a rotary motion of the electric air pump 3 to generate a pump positive pressure in the air pump inside (the air duct 51, the pump chamber 52 and the airflow path 61).

On the other hand, when the motor shaft 5 rotates (for example, in the forward direction), the clutch inner integral with the front end of the motor shaft 5 also rotates. Then, a centrifugal force acts on a plurality of clutch weights 56 slidably assembled in the clutch inner via the connecting member 41a supported by the clutch inner. When a rotational speed of the motor shaft 5 is more than a predetermined value (motor rotational speed per unit hour at which the clutch engagement is possible) and the centrifugal force acting on the plurality of the clutch weights 56 becomes great, the plurality of the clutch weights 56 travels in a radial direction perpendicular to the axial direction of the clutch inner against an urging force of a resilient deformable member such as a leaf spring. Then, the plurality of the clutch weights 56 are engaged to the engagement grooves formed in an inner periphery surface of the clutch outer.

Then, the clutch outer and the clutch inner become in an engagement condition by means of the plurality of the clutch weights 56. That is, the centrifugal clutch 41 is ON and the motor torque is transmitted in the order of the clutch inner, the plurality of the clutch weights 56 and the clutch outer, and then the friction plate 57 integral with the front end of the clutch outer starts to rotate. Since the a friction surface of the friction plate 57 and a friction surface of the friction plate 58 of the torque limiter 42 are frictionally engaged, the motor torque is transmitted from the friction plate 57 to the friction plate 58, so that the rotor sleeve 59 of the motion-direction conversion mechanism 7 all the time connected to the friction plate 58 starts to rotate.

The inner periphery screw part 60 of the rotor sleeve 59 is threaded into the outer periphery screw part 66 of the valve shaft 8, and a rotational action (rotary motion) of the valve shaft 8 is restricted by an engagement part provided on the inner periphery part of the fourth case 34 and the fifth case 35. Therefore, the valve shaft 8 performs a linear motion in the axial direction by rotary motion of the rotor sleeve 59. That is, the valve shaft 8 linearly advances in the axial direction. The valve 9 disposed in a collar shape at one end of the valve shaft 8 in the axial direction is unseated from the first valve seat and is thus opened to open the valve bore 62 (fully opened condition of the valve 9).

Accordingly, the secondary air discharged from the pump discharge opening 54 of the electric air pump 3 flows into the secondary airflow pipe 62 via the airflow path 61, the valve bore 62, the airflow path 63 and the outlet port 64 in that order. The secondary airflow into the secondary airflow pipe 2 flows into the check valve 25. Then, a pressure of the secondary airflow into the check valve 25 opens the lead valve to open the air passing opening (valve bore). Thereby, the secondary air which has passed through the air passing opening flows into the engine exhaust pipe 21 via the secondary airflow pipe 2 and is sent to the three-way catalyst converter 23. As a result, at the engine starting time, even when the exhaust gas temperature is low, the secondary air generated by operating the electric pump 3 and the valve 9 is led to the three-way catalyst converter 23 and therefore, oxygen burns and the three-way catalyst is sublimed and activated to purify the exhaust gas. In particular, hydrogen carbon (HC) is converted into non-toxic water ($H_2O$) by oxidation, so that a discharge amount of the hydrogen carbon (HC) into an atmosphere is reduced.

Herein, the impeller 6 rotates by the motor torque while the secondary air is introduced into the three-way catalyst converter 23. Therefore, the valve 9 continues to be driven toward one side in the axial direction (opening direction of the valve 9) for opening the valve 9. When the valve 9 is seated at the second valve seat to fully open the valve bore 2, more travel of the valve 9 toward the one side (opening direction of the valve 9) in the axial direction of the valve 9 is restricted. Thereby, excessive load torque exerts on the rotor sleeve 59 threaded into the valve shaft 8 and the friction plate 58 of a motion-direction conversion mechanism side. As a result, the friction plate 57 of a centrifugal clutch side starts to slide on the friction surface of the friction plate 58 of the motion-direction conversion mechanism side. That is, the torque limiter 42 is ON and therefore, transmission of the motor torque from the centrifugal clutch 41 to the motion-direction conversion mechanism 7 is cut off. Accordingly, the respective components constituting the motion-direction conversion mechanism 7 and the valve 9 stop at the present positions.

Later, the ECU 10 stops supply of electric power (pump drive current) to the electric motor 4 at the stage when a predetermined time elapses after supply of the pressurized secondary air by the impeller 6 starts or at the stage when a temperature of the three-way catalyst detected by the catalyst temperature sensor 24 increases to more than a second predetermined value higher than a first predetermined value. As a result, rotation of the motor shaft 5 stops (electric air pump 3 is OFF). Then, the centrifugal force acting on the plurality of the clutch weights 56 are not generated, so that the plurality of the clutch weights 56 are moved toward the clutch inner side (centripetal direction) by urging forces of the resilient deformable member such as a leaf spring to release the engagement condition between the clutch inner and the clutch outer. That is, the centrifugal clutch 41 is OFF and rotation of the friction plate 57 integral with the front end of the clutch outer stops. Thereby the valve 9 is unseated from the second valve seat by the urging force of the coil spring 43 and then is seated at the first valve seat to close the valve bore 62 (fully closed condition of the valve 9).

Herein, when the valve 9 travels toward the other side (closing direction of the valve 9) in the axial direction, the valve shaft 8 also travels toward the other side in the axial direction. The rotor sleeve 59 threaded into the outer periphery screw part 66 of the valve shaft 8 rotates caused by the travel toward the other side of the axial direction of the valve shaft 8. However, since the centrifugal clutch 41 is OFF, even if the torque of the rotor sleeve 59 is transmitted to the clutch outer by the frictional engagement between the friction plate 57 and the friction plate 58 of the torque limiter 42, the clutch outer rotates idle and the torque of the rotor sleeve 59 is not transmitted to the plurality of the clutch weights and the clutch inner, and the motor shaft 5 does not rotate, either.

As described above, the secondary air supply system incorporating the electric air pump unit 1 of the first embodiment reviews the entire arrangement of the conventional secondary air supply system, and also aims at downsizing and improvement of control responsiveness of the system. That is, in the secondary air supply system of the first embodiment, the self-opened type valve 9 is driven and opened by torque of the electric air pump 3, i.e., motor torque of the motor shaft 5 of the electric motor 4 rotating the impeller 6. In addition, when the rotation of the electric air pump 3 stops, that is, when supply of electric power to the electric motor 4 stops, the valve 9 is urged in the closing direction by the urging force of the coil spring 43.

Thereby, the self-opened type valve 9 is driven and opened by the motor torque of the motor shaft 5 of the electric air pump 3 and therefore, the diaphragm for driving and opening the valve 9 is not necessary and downsizing of the valve drive apparatus is possible. Accordingly, downsizing of the entire secondary air supply system is possible, thus improving mount-properties of the system in an engine room of a vehicle for an automobile or the like. In addition, reduction in the number of components and in assembly labors is possible. Further, since at rotation cease of the electric air pump 3, the valve 9 can be held at fully closed condition by an urging force of the coil spring 43, the exhaust gas or condensed water is prevented from entering into the electric air pump inside. As a result, corrosion or deposition of deposits caused by the remaining of the exhaust gas or the condensed water inside the electric air pump can be prevented.

In addition, since the self-opened type valve 9 is located very close to the electric air pump 3 and is assembled in the motor shaft 5 of the electric motor 4 via the motion-direction conversion mechanism 7, an opening action of the valve 9 can start in a shorter time after supply of electric power to the electric motor 4 starts, that is, after a rotary action of the impeller 6 of the electric air pump 3 starts. Therefore, a response time from when the electric power is supplied to the electric motor 4 to when the valve 9 opens (for example, fully opened condition) can be reduced, thus improving control responsiveness at the time of driving and opening the valve 9. As a result, it is possible to perform air injection at an earlier time immediately after the engine starts, providing an improvement of emission performance.

Second Embodiment

Figure 3:
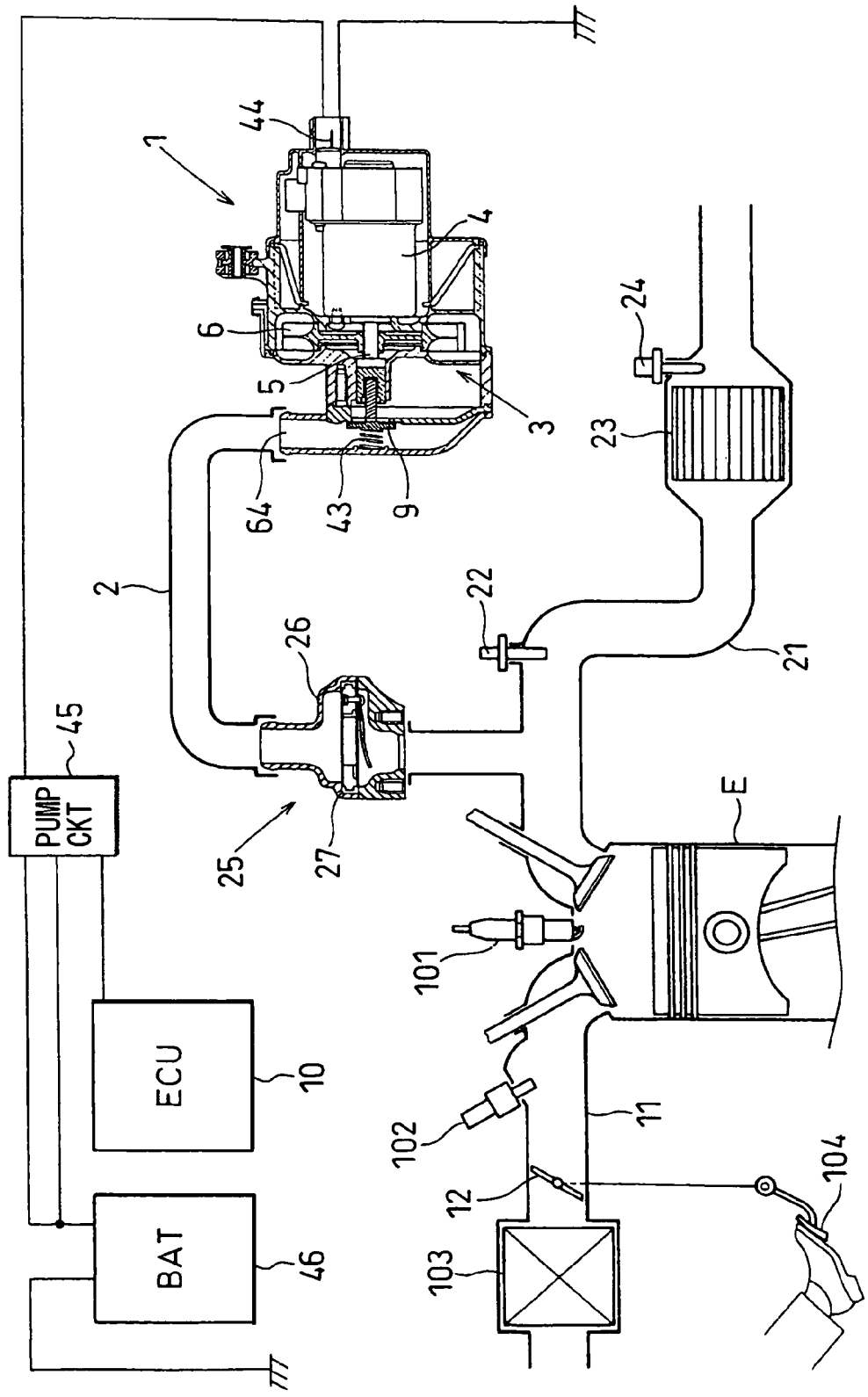
FIG. 3 is a schematic diagram showing an entire arrangement of a secondary air supply system in a second embodiment of the present invention.
Figure 4:
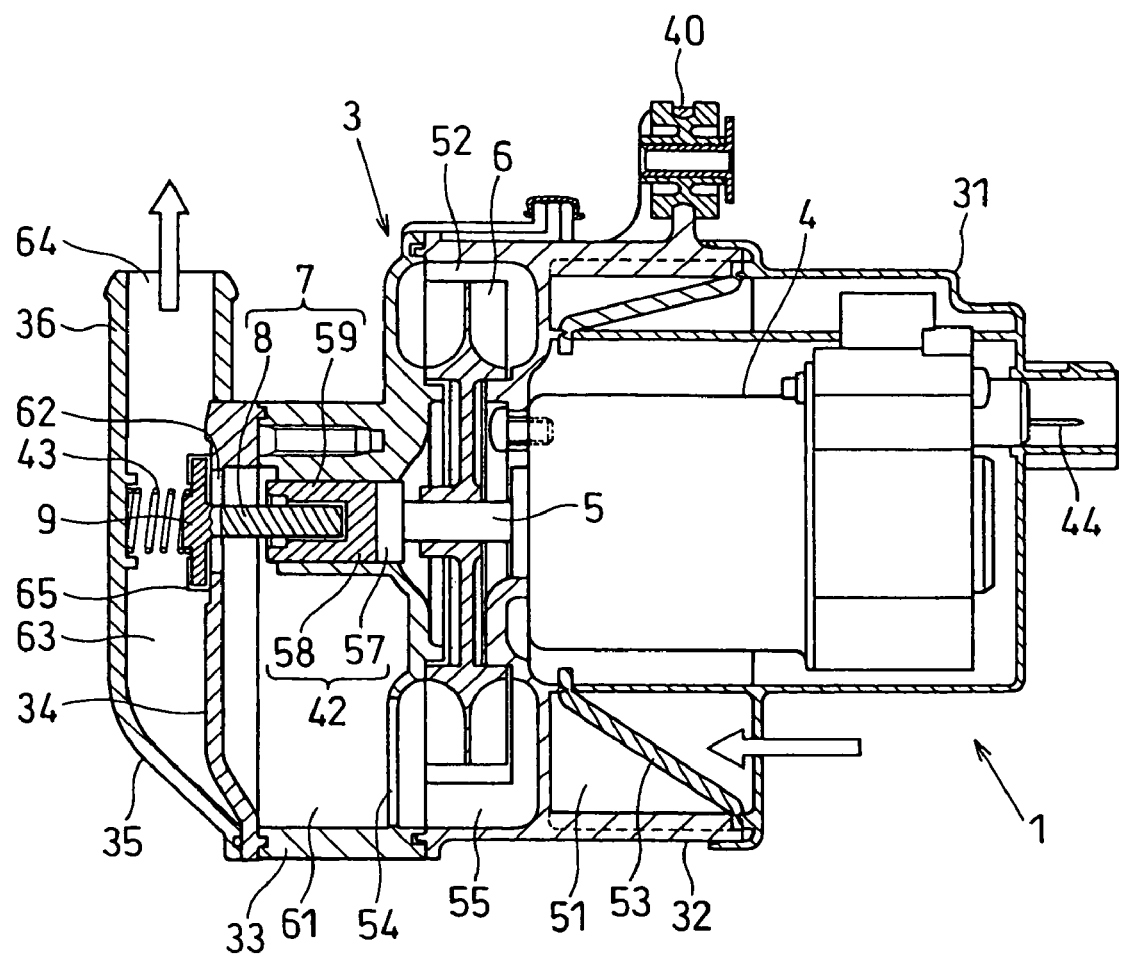
FIG. 4 is a cross section showing an entire arrangement of an electric air pump unit in a second embodiment of the present invention.

FIGS. 3 and 4 show a second embodiment of the present invention. FIG. 3 is a block diagram showing an entire arrangement of a secondary air supply system. FIG. 4 is a cross section showing an electric air pump unit.

In the second embodiment, the friction plate 57 of the torque limiter 42 instead of the clutch inner of the centrifugal clutch 41 is mounted integrally with the front end of the motor shaft 5 in the axial direction by joint means such as welding. This causes elimination of the plurality of the clutch weights 56, the clutch inner, the clutch outer and the like, leading to further reduction in the number of components and in assembly labors as compared to the first embodiment. The centrifugal clutch 41 may be provided between the motor shaft 5 and the torque limiter 42. The coil spring 43 may be provided or not provided. In the electric motor 4 of the second embodiment, flow directions of a pump drive current supplied to the armature winding are set as two directions which are forward and reverse directions, thus forming rotational motion directions of the motor shaft 5 with the forward and reverse directions.

Herein, the motor shaft 5 is rotated in the forward direction at a predetermined speed. As a result, the impeller 6 rotates by the motor torque (the electric air pump 3 is ON). That is, air is taken from the inlet port caused by rotation of the electric air pump 3, thereby generating the pump positive pressure in the electric air pump inside (the air duct 51, the pump chamber 52 and the airflow path 61). At this point, the motor torque is transmitted via the torque limiter 42 to the motion-direction conversion mechanism 7 and the rotary motion of the motor shaft 5 is converted into the linear motion by the motion-direction conversion mechanism 7. Therefore, the valve shaft 8 performs the linear motion. Accordingly, the valve 9 retained and fixed to the valve shaft 8 also performs a linear motion.

As a result, since the valve 9 is driven and opened by rotary motion of the electric air pump 3, the valve bore 62 is opened (fully opened condition of the valve 9). Therefore, the air stream is generated by rotary motion of the electric air pump 3 to go from the pump discharge opening 54 to the outlet port 64 via the airflow path 61, the valve bore 62 and the airflow path 63 in that order. When the valve 9 is fully opened, the same as in the first embodiment, the excessive load torque acts on the rotor sleeve 59 and the friction plate 58 of the motion-direction conversion mechanism side. Therefore, the friction plate 57 of the motor shaft side slides on the friction surface of the friction plate 58, thus cutting off transmission of the motor torque from the motor shaft 5 to the motion-direction conversion mechanism 7.

In addition, when the motor shaft 5 is rotated in the reverse direction, generation of the air stream stops (the electric air pump 3 is OFF). Then, since the valve 9 is driven and closed by rotary motion of the electric air pump 3, the valve bore 62 is closed (fully closed condition of the valve 9).

Third Embodiment

Figure 5:
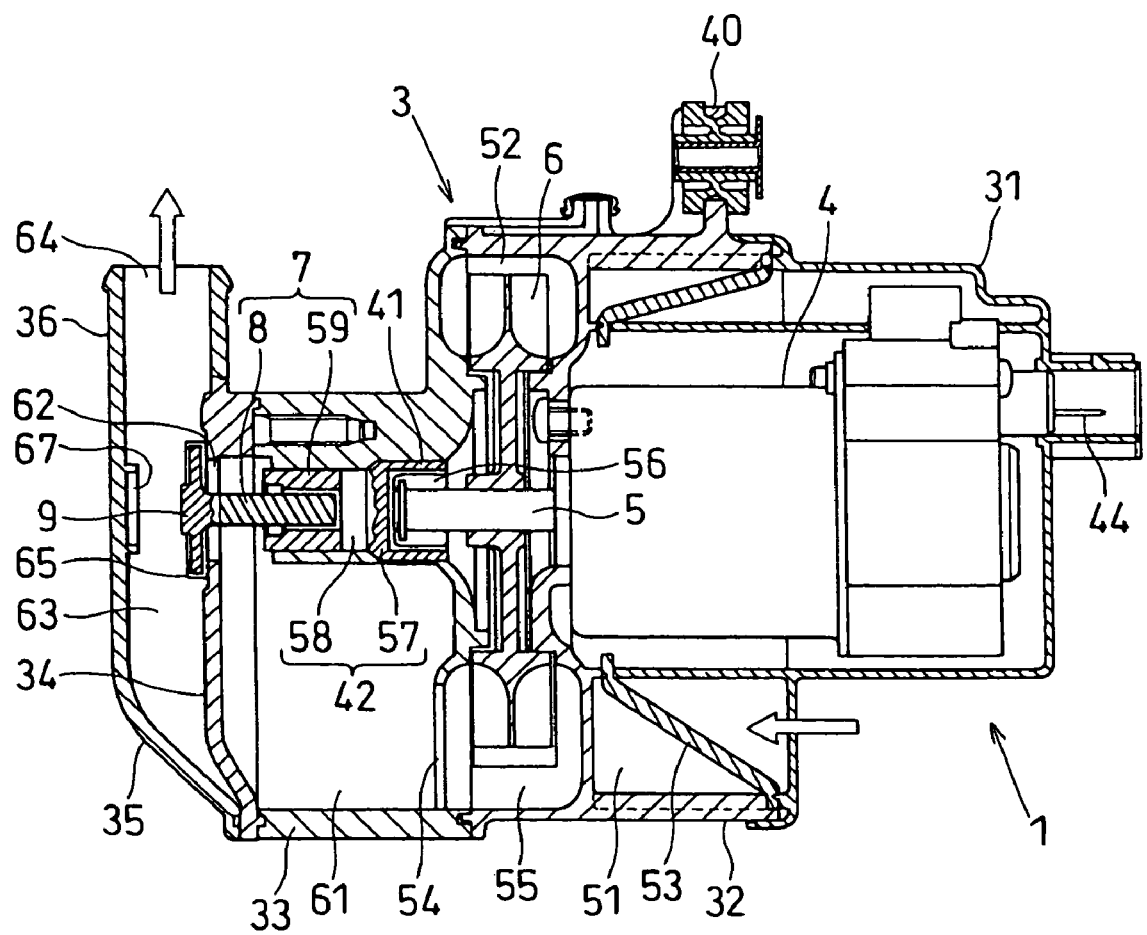
FIG. 5 is a cross section showing an entire arrangement of an electric air pump unit in a third embodiment of the present invention.
Figure 6:
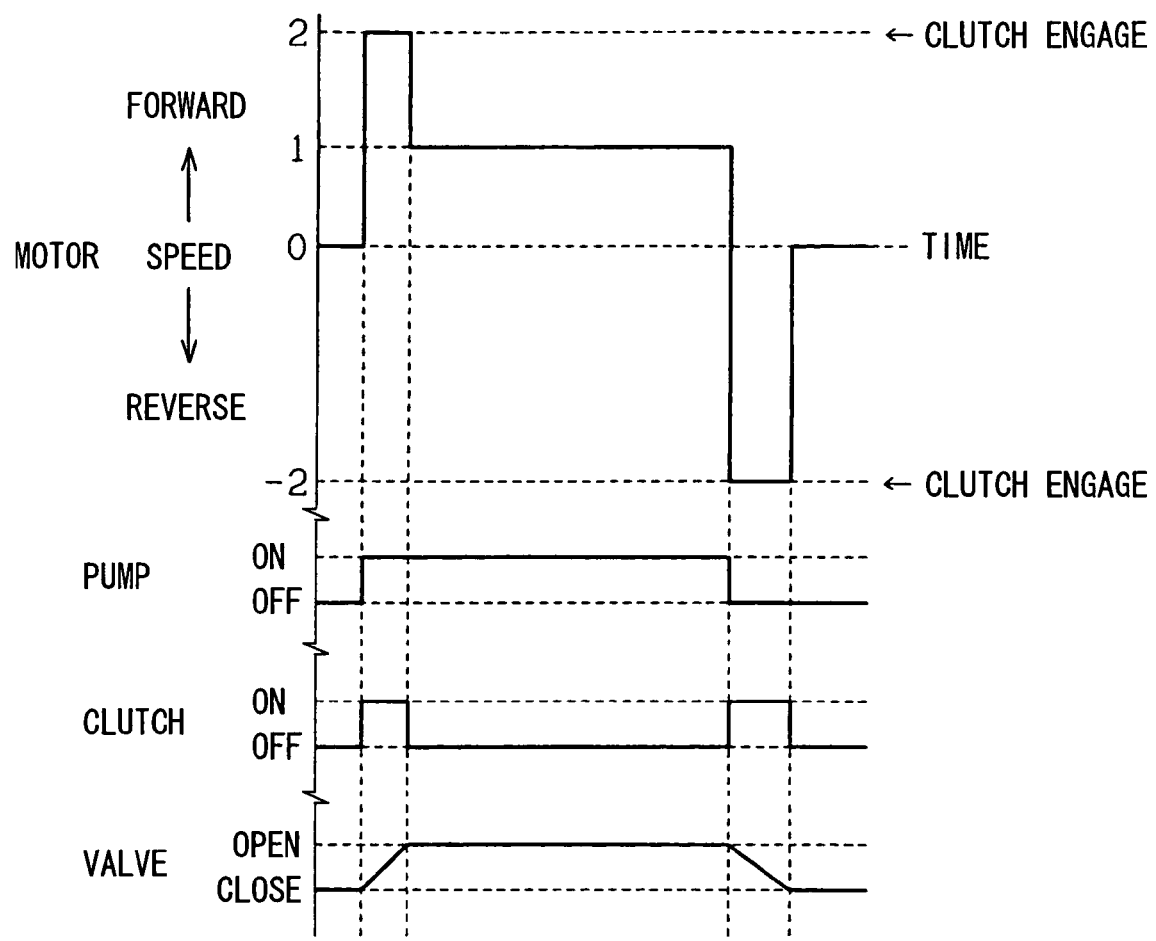
FIG. 6 is a timing chart showing a motor operation, a pump operation, a centrifugal clutch and a valve operation in a third embodiment of the invention.

FIGS. 5 and 6 show a third embodiment of the present invention. FIG. 5 is a cross section showing an electric air pump unit.

In the third embodiment, a stopper 67 is provided in the second valve seat of the fifth case 35. The valve 9 gets in contact with the stopper 67 when the valve 9 opens. In the electric motor 4 in the third embodiment, the rotational directions of the motor shaft 5 are set as two directions which are forward and reverse directions in the same way as in the second embodiment. As a result, the valve 9 can be driven and closed without provision of the coil spring 43, thereby further reduction in the number of components and in assembly labors as compared to the first embodiment. The ECU 10 in the third embodiment includes a known microcomputer therein in the same as in the first embodiment. When the ignition switch is ON and the engine E starts to operate, the ECU 10 adjusts electric power supplied to the electric motor 4 based upon control programs stored in the memory to control rotational speeds (motor rotational speed per unit hour) of the motor shaft 5.

Further, when the exhaust gas temperature is low, for example, immediately after the engine E starts, the ECU 10 supplies electric power (pump drive current) to the electric motor 4 to rotate the motor shaft 5 in the forward direction at a high rotational speed. Next, a fully opened condition of the valve 9 is detected by a contact type touch sensor or a non-contact type position sensor to restrict the electric power (pump drive current) supplied to the electric motor 4, thus rotating the motor shaft 5 in the forward direction at a low rotational speed. Next, the ECU 10 supplies the electric power (pump drive current) to the electric motor 4 to rotate the motor shaft in the reverse direction at a high rotational speed. Next, a fully closed condition of the valve 9 is detected by a contact type touch sensor or a non-contact type position sensor to stop supply of the electric power (pump drive current) to the electric motor 4.

Next, a control method of the secondary air supply system of the third embodiment will be briefly explained with reference to FIGS. 5 and 6. FIG. 6 is a timing chart showing a motor operation, a pumping action, a centrifugal clutch and a valve operation.

The ECU 10, as shown in a timing chart in FIG. 6, rotates the motor shaft 5 in the forward direction at a high rotational speed when the exhaust gas temperature is low, for example, immediately after the starting of the engine E. As a result, the impeller 6 rotates by the motor torque (the electric air pump 3 is ON). That is, air is taken from the inlet port caused by rotation of the electric air pump 3, thereby generating the pump positive pressure in the electric air pump inside (the air duct 51, the pump chamber 52 and the airflow path 61). At this point, the plurality of the clutch weights 56 travel toward an outer diameter side in the diameter direction of the motor shaft 5 by the centrifugal force caused by high rotational speed of the motor shaft 5 to be engaged to the engagement grooves of the clutch outer.

As a result, the clutch inner and the clutch outer of the centrifugal clutch 41 enter into the engagement condition (the centrifugal clutch 41 is ON (complete clutch)). Accordingly, the motor torque is transmitted via the torque limiter 42 and the motion-direction conversion mechanism 7 to the valve shaft 8 and therefore, the valve shaft 8 linearly travels toward one side (opening direction of the valve 9) in the axial direction (linear motion is performed). Accordingly, the valve 9 is driven and opened by the rotary motion of the electric air pump 3, thereby opening the valve bore 62 (fully opened condition of the valve 9). This produces the air stream going from the airflow path 61 to the outlet port 64 via the valve bore 62 and the airflow path 63 by rotary motion of the electric air pump 3.

However, when the valve 9 fully opens, the excessive load torque acts on the torque limiter 42 and the motion-direction conversion mechanism 7 in the same way as the first embodiment and the friction plate 57 of the centrifugal clutch side slides on the friction surface of the friction plate 58. That is, the centrifugal clutch 41 is OFF by the action (ON) of the torque limiter 42. In this case, the OFF of the centrifugal clutch 41 indicates the condition that transmission of the motor torque from the centrifugal clutch 41 to the motion-direction conversion mechanism 7 is cut off even if the clutch inner and the clutch outer of the centrifugal clutch 41 are in an engagement condition.

The ECU 10 detects the fully opened condition of the valve 9 by a contact type touch sensor or a non-contact type position sensor and then, as shown in a timing chart in FIG. 6, rotates the motor shaft 5 in the forward direction at a low rotational speed. In this case, since the centrifugal force acting on the plurality of the clutch weights 56 become smaller, a motor side part of the clutch weights 56 travels to an inner diameter side in the radial direction of the clutch inner, so that the clutch inner and the clutch outer of the centrifugal clutch 41 are disengaged (the centrifugal clutch 41 is OFF).

In the third embodiment, the coil spring 43 is not provided. Therefore, even if the centrifugal clutch 41 is OFF, the fully opened condition of the valve 9 is maintained. In addition, the motor torque is transmitted from the motor shaft 5 to the impeller 6 even if the centrifugal clutch 41 is OFF. Therefore, the air stream (pump positive pressure) continues to be generated to go from the airflow path 61 to the outlet port 64 via the valve bore 62 and the airflow path 63 in that order.

Further, the ECU 10, as shown in a timing chart in FIG. 6, rotates the motor shaft 5 in the reverse direction at a high rotational speed at a point when a predetermined time elapses after pressurized supply of the secondary air by the impeller 6 starts. This causes the impeller 6 to rotate by the motor torque (the electric air pump 3 is OFF). At this point, the centrifugal force acts on the plurality of the clutch weights 56 due to a high rotational speed of the motor shaft 5 to provide engagement condition of the clutch inner and the clutch outer of the centrifugal clutch 41 (the centrifugal clutch 41 is ON (complete clutch)). Therefore, the motor torque is transmitted to the valve shaft 8, which is then linearly moved toward the other side (closing direction) in the axial direction (the linear motion is performed). Accordingly, since the valve 9 is driven and opened by rotary motion of the electric air pump 3, the valve bore 62 is closed (fully closed condition of the valve 9).

Next, the ECU 10, as shown in a time chart in FIG. 6, stops supply of electric power (pump drive current) to the electric motor 4 by detecting the fully closed condition of the valve 9 with a contact type touch sensor or a non-contact type position sensor or the like. Hereby, the impeller 6 completely stops.

Fourth Embodiment

Figure 7:
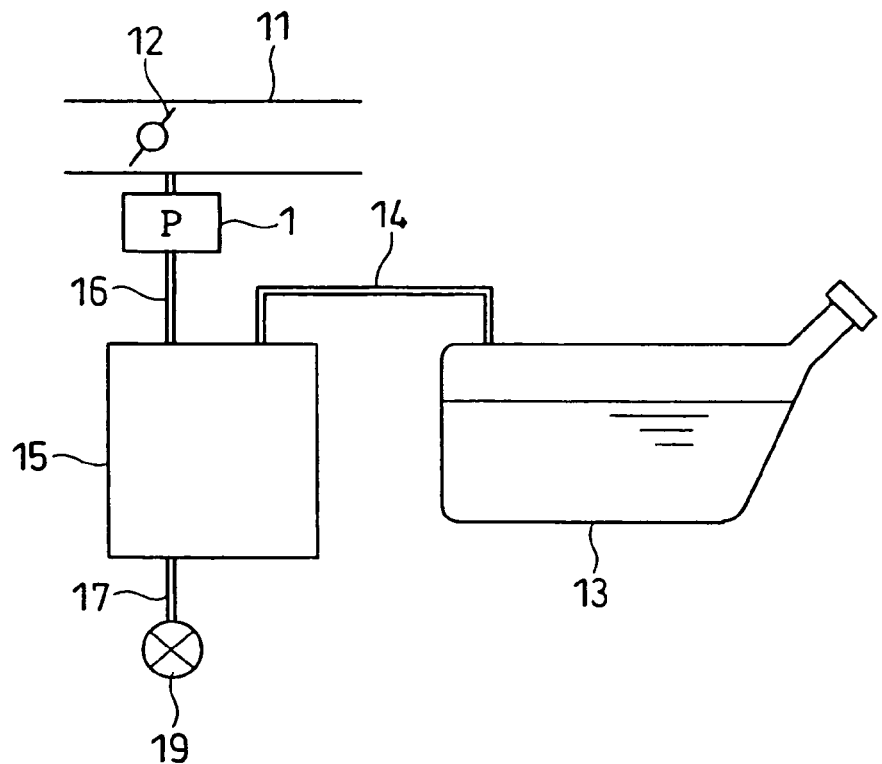
FIG. 7 is a schematic diagram showing an entire arrangement of an evaporation fuel treatment system in a fourth embodiment of the present invention.

FIG. 7 shows a fourth embodiment of the present invention and is a block diagram showing an entire arrangement of an evaporation fuel treatment system.

The electric air pump unit 1 in the fourth embodiment is incorporated in an evaporation fuel treatment system in which evaporation fuel (air containing an evaporation gas) evaporated in a fuel tank 13 for a vehicle such as an automobile is forcibly purged into the combustion chamber of the engine E via the airflow pipe 14, a canister 15, the airflow pipe 16 and the engine intake pipe 11, thereby preventing emission of the evaporation fuel into an atmosphere. In the evaporation fuel treatment system, the fuel tank 13 and the canister 15 are communicated through the airflow pipe 14 and the engine intake pipe 11 communicated with the combustion chamber of the engine E and the canister 15 are communicated through the airflow pipe 16.

An airflow path (evaporation fuel flow path) is formed in the airflow pipe 14 for introducing the evaporation fuel evaporated in the fuel tank 13 into the canister 15. In addition, an airflow path (evaporation fuel flow path) is formed in the airflow pipe 16 for introducing the evaporation fuel adsorbed in the canister 15 into the engine intake pipe 11 positioned at the downstream side (intake port side) in the intake airflow direction of the throttle valve 12 via the electric air pump unit 1. A pressure sensor (in-tank pressure sensor: not shown) for detecting a pressure (in-tank pressure) in the fuel tank 13 is provided in the fuel tank 13.

In addition, an adsorbent (for example, an active carbon) for adsorbing the evaporation fuel is received in the canister 15. An air-opening pipe 17 opened to the air is connected to an air-opening bore of the canister 15. A filter (not shown) for filtering airflow into the canister 15 and a canister closed valve 19 as a normal-opening type electromagnetic opening valve for closing the air-opening bore of the canister 15 as needed are provided in the half way of the air-opening pipe 17. The filter functions in such a way that airflow therein from an air suction opening of the air-opening pipe 17 passes through it and foreign matters mixed with the air are trapped, thus preventing the entering of the foreign matters into the engine intake pipe 11 and into the canister 15.

The electric air pump unit 1 in the fourth embodiment may use the electric air pump 1 in either one of the first to the third embodiment, but uses the electric air pump 1 in the third embodiment as one example. In the fourth embodiment, the electric air pump 3 integral with the self-opening type valve 9 is used as a purge pump for forcibly purging the evaporation fuel into the engine intake pipe 11. A mount-stay 40 of the second case 32 in the electric air pump unit 1 is clamped and fixed to the engine intake pipe 11 by a fastening bolt or the like, in particular to a throttle body including a throttle bore having a circular cross section for receiving a throttle valve 12 so as to be opened/closed. An air suction opening (inlet port) of the first case 31 communicates an air duct 51 including a filter 53 therein with the airflow pipe 16 in the canister side. An air discharge opening (outlet port 64) of the fifth case 35 communicates an airflow path 63 receiving the valve 9 so as to be opened/closed (possible reciprocal, linear motion) with the airflow pipe 16 in the intake pipe side.

At the time of purging the evaporation fuel adsorbed in the adsorbent in the canister 15 into the engine intake pipe 11, electric power is supplied to the electric motor 4 in the same way as the electric air pump unit 1 in the third embodiment to rotate the impeller 6 by motor torque of the motor shaft 5. Further, the motor torque is transmitted to the valve shaft 8 via the centrifugal clutch 41, the torque limiter 42 and the motion-direction conversion mechanism 7 to open the valve 9.

As a result, when a canister opening/closing valve 19 is opened to open the air-opening bore, a negative pressure is generated in the airflow path of the airflow pipe 16 by rotary motion of the impeller 6 and the negative pressure reaches a purge port of the canister 15. Therefore, the air stream, which goes from the air-opening bore of the canister 15 to the purge port is generated. When the air stream is generated, desorption occurs in the evaporation fuel adsorbed in the adsorbent in the canister 15. Accordingly, when the intake valve is opened during the operating of the engine E, the impeller 6 is rotated by motor torque to open the valve 9, thereby purging the evaporation fuel adsorbed in the adsorbent in the canister 15 into the combustion chamber of the engine E through the engine intake pipe 11 and the intake port.

As described above, according to the electric air pump unit 1 in the fourth embodiment, even in the engine E where the intake pipe negative pressure is likely to reduce (the intake pressure in the engine intake pipe 11 is likely to increase), the electric air pump unit 1 is incorporated in the evaporation fuel treatment system, the impeller 6 is driven and rotated, and the valve 9 is driven and opened, thereby carrying out the purge of sufficient evaporation fuel. Maintaining the valve 9 at a fully closed condition at an operation cease time of the impeller 6 prevents leak of the evaporation fuel and therefore, it is not necessary to newly add a valve exclusively for preventing leak of the evaporation fuel.

The valve 9 in the fourth embodiment is provided with a function of a purge control valve disposed in the halfway of the airflow pipe 16 of the conventional evaporation fuel treatment system. Therefore, in a case of carrying out leak check of the evaporation fuel in the closed space in the evaporation fuel treatment system, after the canister opening/closing valve 19 is closed and the valve 9 is opened to introduce an intake negative pressure into the canister 15, the valve 9 is closed, thus completely sealing the closed space in the evaporation fuel treatment system. Then, after a predetermined time elapses, it is checked whether or not a pressure in the fuel tank 13 increases by the pressure sensor. In this way, it is possible to carry out the leak check of the evaporation fuel in the close space in the evaporation fuel treatment system. That is, it is not required to provide a purge valve for sealing the closed space in the evaporation fuel treatment system, except for the valve 9 and the canister opening/closing valve 19.

Accordingly, it is possible to create downsizing of the entire evaporation fuel treatment system and improve mount-properties thereof in an engine room for a vehicle such as an automobile. However, if the intake pipe negative pressure increases, it is possible to perform the purge of the evaporation fuel without an operation of the electric air pump 1 as long as the canister opening/closing valve 19 is opened.

17

Fifth Embodiment

Figure 8:
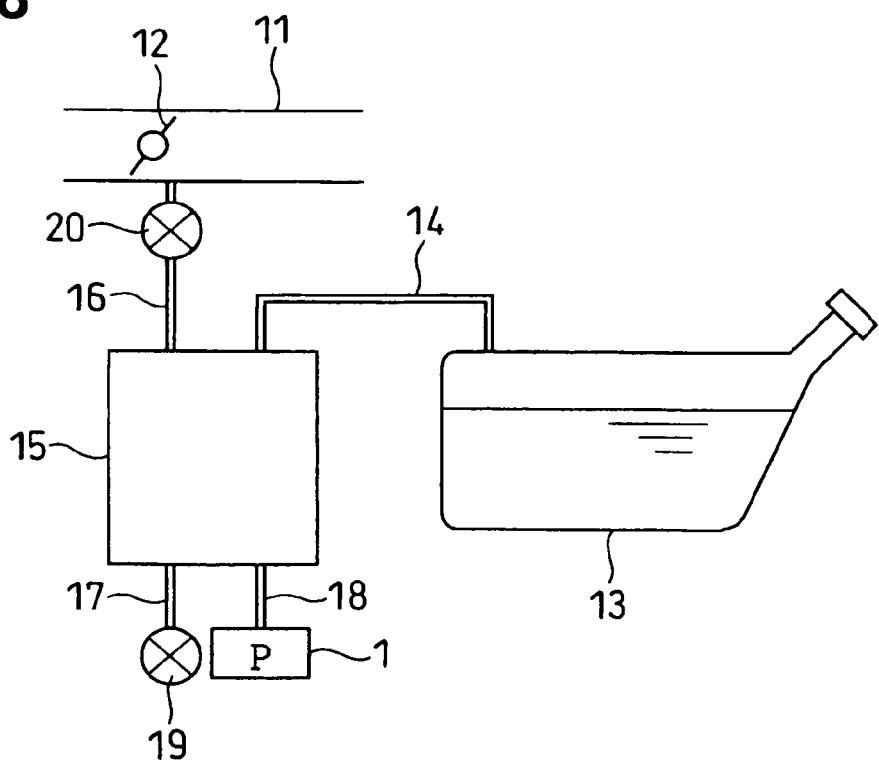
FIG. 8 is a schematic diagram showing an entire arrangement of an evaporation fuel treatment system in a fifth embodiment of the present invention.

FIG. 8 shows a fifth embodiment of the present invention. FIG. 8 is a block diagram showing an entire arrangement of an evaporation fuel treatment system.

The electric air pump unit 1 in the fifth embodiment is, in the same as shown in the fourth embodiment, is incorporated in the evaporation fuel treatment system. An airflow path (evaporation fuel flow path) is formed in the airflow pipe 16 for introducing the evaporation fuel adsorbed in the canister 15 to the engine intake pipe 11 via a purge VSV (vacuum switching valve) 20. The purge VSV 20 is a purge control valve, which is duty-driven by the ECU 10 to adjust a flow amount (purge amount) of the evaporation fuel flowing in the airflow pipe 16.

The air-opening pipe (first air-opening pipe) 17 is connected to a first air-opening bore of the canister 15. The filter and the canister opening/closing valve 19 are disposed in the halfway of the air-opening pipe 17 in the same way as in the fourth embodiment. An air-opening pipe (second air-opening pipe) 18 is connected to a second air-opening bore of the canister 15. The electric air pump unit 1 is connected to an upper stream end of the air-opening pipe 18 in the air stream direction. An airflow path is formed in the air-opening pipe 18 for introducing the air stream generated by operating the impeller 16 into the canister 15.

The electric air pump unit 1 in the fifth embodiment may use the electric air pump 1 in either one of the first to the third embodiment, but uses the electric air pump 1 in the third embodiment as one example. In the fifth embodiment, the impeller 6 integral with the self-opening type valve 9 is used as a purge pump for forcibly purging the evaporation fuel into the engine intake pipe 11. A mount-stay 40 of the second case 32 in the electric air pump unit 1 is clamped and fixed to the canister 15 by a fastening bolt or the like. An air suction opening (inlet port) of the first case 31 serves as an air suction opening for taking the air into an air duct 51 including a filter 53 therein. An air discharge opening (outlet port 64) of the fifth case 35 communicates with an airflow path 63 and an airflow path of the air-opening pipe 18.

Herein, when the purge VSV 20 is opened during the operating of the engine E, an intake pipe vacuum of the engine E reaches the purge port of the canister 15. At this point, electric power is supplied to the electric motor 4 in the same way as the electric air pump unit 1 in the third embodiment to rotate and drive the impeller 6 (operating condition of the impeller 6: ON) by motor torque of the motor shaft 5 and also the motor torque is transmitted to the valve shaft 8 via the centrifugal clutch 41, the torque limiter 42 and the motion-direction conversion mechanism 7 to open the valve 9.

As a result, when the valve 9 is opened to open the valve bore 62, a pump positive pressure is generated in the airflow path of the air-opening pipe 18 by rotary motion of the impeller 6 and the pump positive pressure reaches the second air-opening bore of the canister 15. Therefore, the air stream, which goes from the second air-opening bore of the canister 15 to the purge port is generated. When such air stream is generated, desorption occurs in the evaporation fuel adsorbed in the adsorbent in the canister 15. Accordingly, when the intake valve is opened during the operating of the engine E, the impeller 6 is rotated by motor torque and the valve 9 is driven and opened, thereby purging the evaporation fuel adsorbed in the adsorbent in the canister 15 into the combustion chamber of the engine E through the engine intake pipe 11 and the intake port. At this point, the canister opening/closing valve 19 may be opened or closed. However, if the intake pipe vacuum increases, it is possible to carry out the purge of the evaporation fuel without an operation of the electric air pump unit 1 as long as the canister opening/closing valve 19 and the purge VSV 20 are opened. Further, the electric air pump unit 1 may be connected to an upper stream end of the air-opening pipe 17 in the air stream direction connected to the first air-opening bore of the canister 15 by eliminating the second air-opening bore of the canister 15 and the air-opening pipe 18.

Sixth Embodiment

Figure 9:
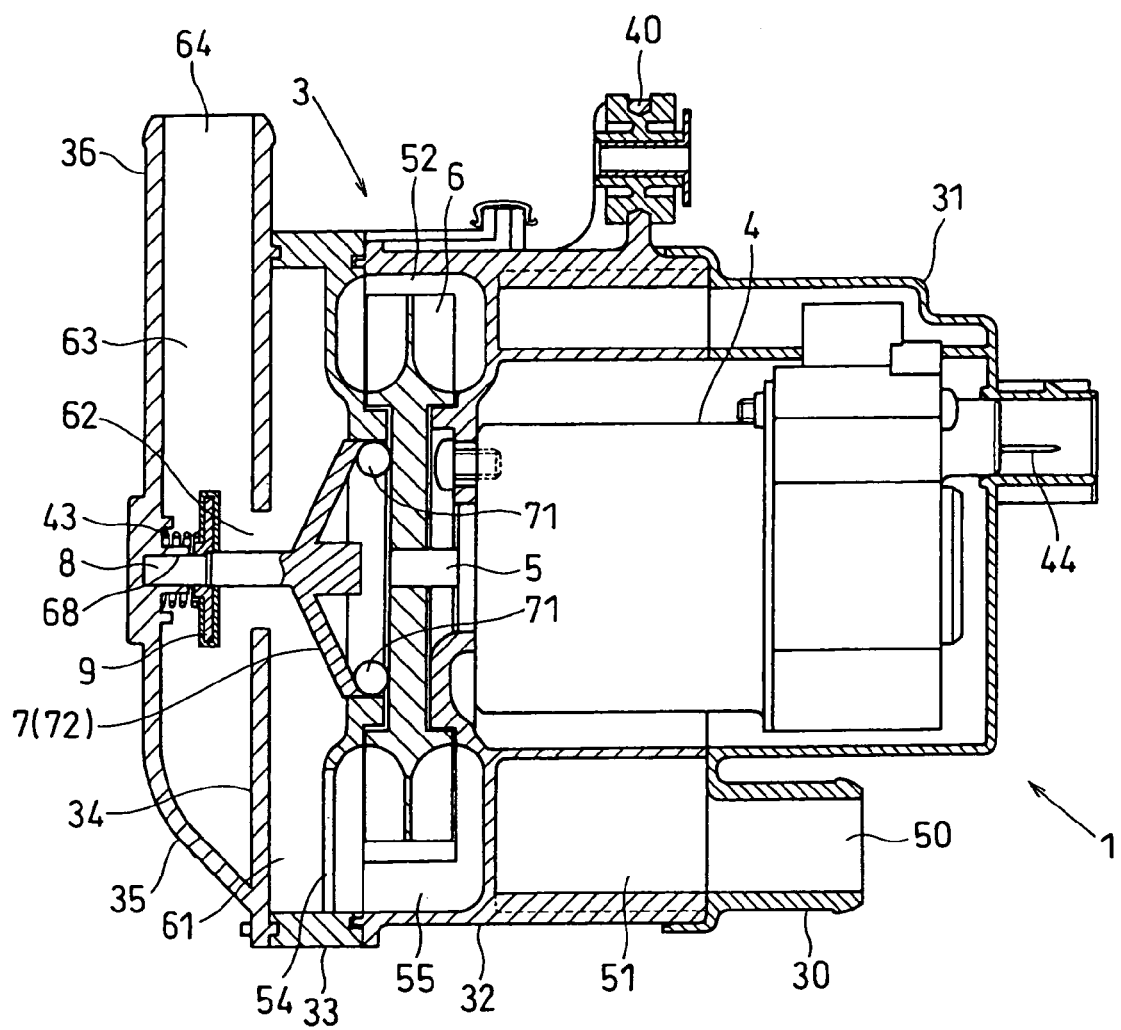
FIG. 9 is a cross section showing an opening state of a valve in a sixth embodiment of the present invention.
Figure 10:
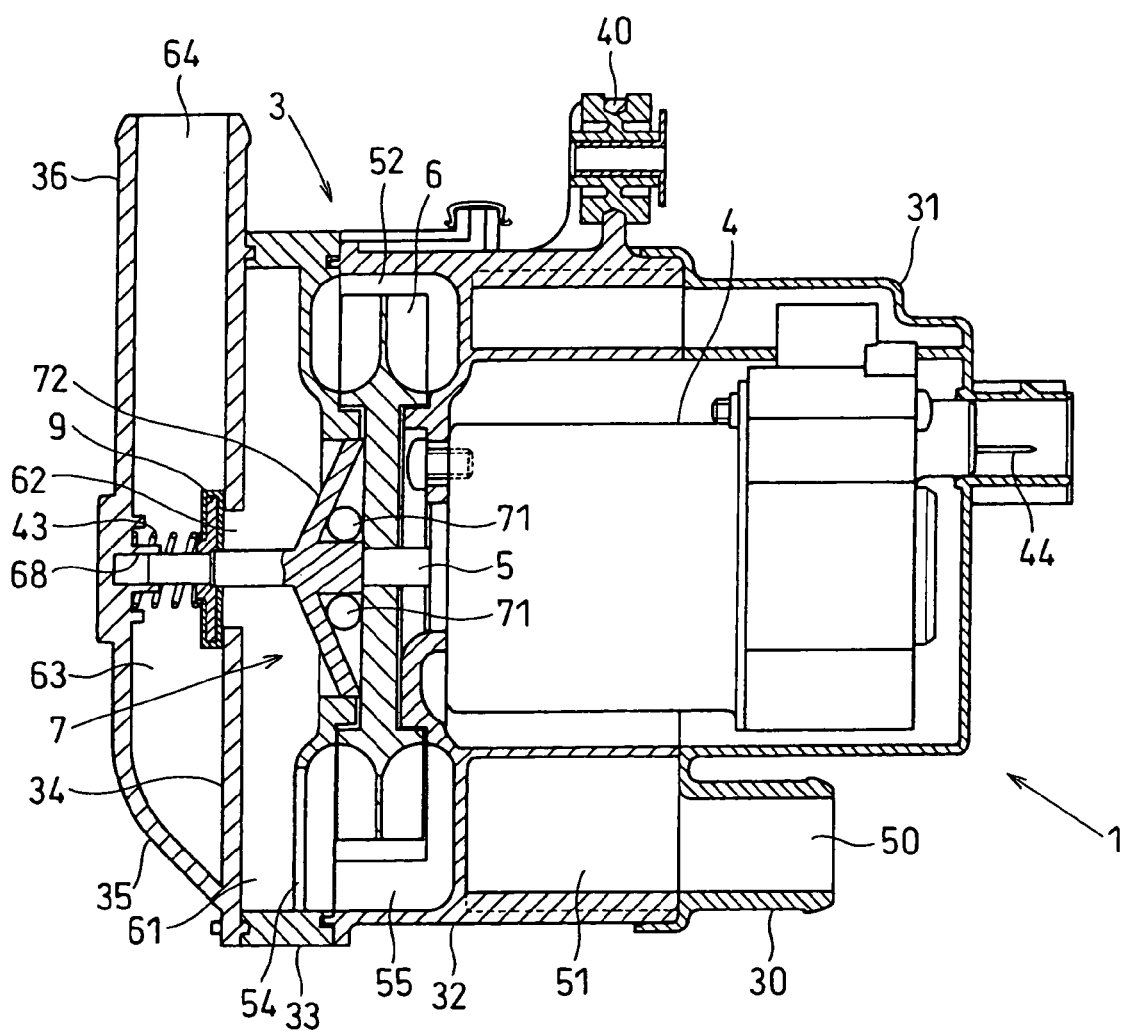
FIG. 10 is a cross section showing a closing state of the valve in a sixth embodiment of the present invention.

FIGS. 9 and 10 show a sixth embodiment of the present invention and is a cross section showing an electric air pump unit.

The electric air pump unit 1 in the sixth embodiment is, in the same way as the first to the fifth embodiment, incorporated in the secondary air supply system or the evaporation fuel treatment system. The electric air pump unit 1 is integral with the electric air pump 3 and the self-opening type valve 9 utilizing the centrifugal force and is covered with five cases (first case 31 to fifth case 35 in that order from the right side in FIG. 9) incorporating components therein. A tubular, inlet-side flow pipe 30 is disposed in the first case 31 and an air suction opening (inlet port 50) is formed in the inlet-side flow pipe 30 for aspiring air into the air duct 51. It should be noted that a filter may be provided in the air duct 51. In addition, a tubular, outlet-side flow pipe 36 is provided in the fifth case 35 and an air discharge opening (outlet port 64) is formed in the outlet-side flow pipe 36.

The valve 9 in the sixth embodiment opens by motor torque and closes by an urging force of the coil spring 43. When the valve 9 is seated at the second valve seat to fully open the valve bore 62 in the sixth embodiment, further travel of the valve 9 toward one side in the axial direction (opening direction of the valve 9) is restricted. A valve guide bore 68 is formed in the second valve seat for slidably supporting the front end part of the valve shaft 8 in the axial direction, which penetrates through a central part of the valve 9. The valve guide bore 68 guides the valve 9, the valve shaft 8 and the motion-direction conversion mechanism 7 such that they perform a reciprocal, linear motion in the axial direction of the motor shaft 5.

The motion-direction conversion mechanism 7 in the sixth embodiment is a spherical body type power transmission mechanism (motion-direction conversion mechanism) formed of a plurality of weights 71 which expand toward a radial outer diameter side upon receiving a centrifugal force, a slider (moving body) 72 integral with the valve shaft 8 of the valve 9. A plurality of radial guide grooves (not shown) are spaced on the side face of the valve made of a ring-like base plate of the impeller 6.

When the centrifugal force acts on the plurality of the weights 71 by rotary motion of the electric air pump 3, the weights 71 travel toward the radial, outer diameter side perpendicular to the center axis direction (rotation center axis direction (axial direction) of the motor shaft 5) of the electric air pump 3. In addition, the plurality of the weights 71 rotate in synchronization with the impeller 6. That is, the weight 71 is a spherical surface body or a spherical body, which, upon receiving the centrifugal force by rotary motion of the electric air pump 3, travels toward the radial, outer diameter side. The weight 71 converts a rotary motion of the electric air pump 3 into a linear motion of the slider 72 by use of the centrifugal force.

In addition, the plurality of the weights 71, upon receiving the centrifugal force by the rotary motion of the electric air pump 3, provide the slider 72 with a linear motion amount in accordance with a travel amount in the radial direction toward the radial, outer diameter side. The plurality of the weights 71 are arranged in such a way that as a rotational speed of the electric air pump 3 or a rotational speed (motor rotational speed per unit hour) of the motor shaft 5 increases, the centrifugal force acting on the weight 71 increases, thereby increasing a travel amount in the radial direction of the weight 71.

The slider 72 is a tapered cylindrical part extending from an outer periphery surface of the valve shaft 8 and is disposed so as to be oblique toward the other side (the right side in the figure) in the axial direction by a predetermined oblique angle to the radial direction. The slider 72 is a conical component which converts a rotary motion of the electric air pump 3 into a linear motion. The slider 72 is arranged in such a way that as the travel amount of the weights 71 in the radial direction increases, the linear motion amount (lift amount) of the slider 72 toward one side (opening direction of the valve 9) in the axial direction of the motor shaft 5 increases.

Further, when the weights 71 travel toward a radial, inner diameter side of the motor shaft 5, a first restriction surface is provided on an outer periphery part of the valve shaft 8 for restricting further travel toward the radial, inner diameter side. When the weights 71 travel toward a radial, outer diameter side of the motor shaft 5, a second restriction surface is provided on an inner periphery part of the third case 33 defining the pump chamber 52 for restricting further travel toward the radial, outer diameter side. The second restriction surface slidably contacts the outermost diameter part positioned at the outermost diameter side of the slider 72 and therefore, serves as a slider guide which guides the slider 72 such that the slider 72 performs a reciprocal, linear motion in the axial direction of the motor shaft 5. The guide groove may be spirally formed on the inner periphery surface of the slider 72 and it may not be necessary to provide a guide groove.

Next, an operation of the electric air pump unit 1 in the sixth embodiment will be briefly explained with reference to FIGS. 9 and 10. FIG. 9 is a cross section showing an opened condition of the valve 9. FIG. 10 is a cross section showing a closed condition of the valve 9.

The ECU 10 rotates the motor shaft 5 in the forward direction at a predetermined rotational speed. As a result, the impeller 6 rotates by the motor torque (the electric air pump 3 is ON). That is, air is taken from the inlet port 50 caused by rotation of the electric air pump 3, thereby generating the pump positive pressure in the electric air pump inside (the air duct 51, the pump chamber 52 and the airflow path 61). At this point, the plurality of the clutch weights 56 travel in the radial guide grooves toward a radial, outer diameter side of the motor shaft 5 by the centrifugal force caused by high rotation of the motor shaft 5 while rotating in synchronization with the impeller 6.

The slider 72 is raised toward one side in the axial direction of the motor shaft 5 in accordance with a travel amount of the plurality of the weights 71 in the radial direction. Thereby, the rotary motion of the motor shaft 5 is converted into the linear motion of the slider 72 and therefore, the slider 72 and the valve shaft 8 perform the linear motion. At this point, as the travel amount of the weights 71 in the radial direction increases, a linear motion amount (lift amount) of the valve 9 toward one side (opening direction of the valve 9) in the axial direction of the motor shaft 5 increases.

Accordingly, since the valve 9 is driven and opened by rotary motion of the electric air pump 3, as shown in FIG. 9, the valve bore 62 is opened (opened condition of the valve 9). This produces an air stream going from the airflow path 61 to the outlet port 64 via the valve bore 62 and airflow path 63 caused by rotary motion of the electric air pump 3. Thereafter, when the supply of electric power to the electric motor 4 stops, the rotation of the electric motor 5 stops (the electric motor 3 is OFF). Then, the valve 9, the valve shaft 8 and the slider 72 travel toward the other side (closing direction of the valve 9) in the axial direction by an urging force of the coil spring 43 and, as shown in FIG. 10, the valve 9 is seated at the first valve seat to close the valve bore 62 (closed condition of the valve 9).

As described above, in the electric air pump unit 1 in the sixth embodiment, since the valve 9 is driven and opened by using the centrifugal force acting on the plurality of the weights 71 by rotary motion of the electric air pump 3, it is possible to achieve downsizing of the valve drive apparatus (valve drive part) for driving and opening the valve 9 due to no use of a diaphragm. The entire weight of the electric air pump unit 1 can be reduced, thereby making it possible to improve mount-properties of the unit 1 into an engine room for a vehicle in an automobile or the like and also reduce the number of components and assembly labors.

Further, a rotational speed (motor rotational speed per unit hour) of the motor shaft 5 is controlled by adjusting electric power supplied to the electric motor 4, thereby adjusting a radial, travel amount of the plurality of the weights 71. As a result, since it is possible to vary a linear motion amount of the valve shaft 8 and the slider 72, a valve opening or a lift amount of the valve 9 can be adjusted. Accordingly, it is possible to carry out a flow control of airflow in the airflow paths 61 and 63 by a rotational speed control of the electric motor 4.

Seventh Embodiment

Figure 11:
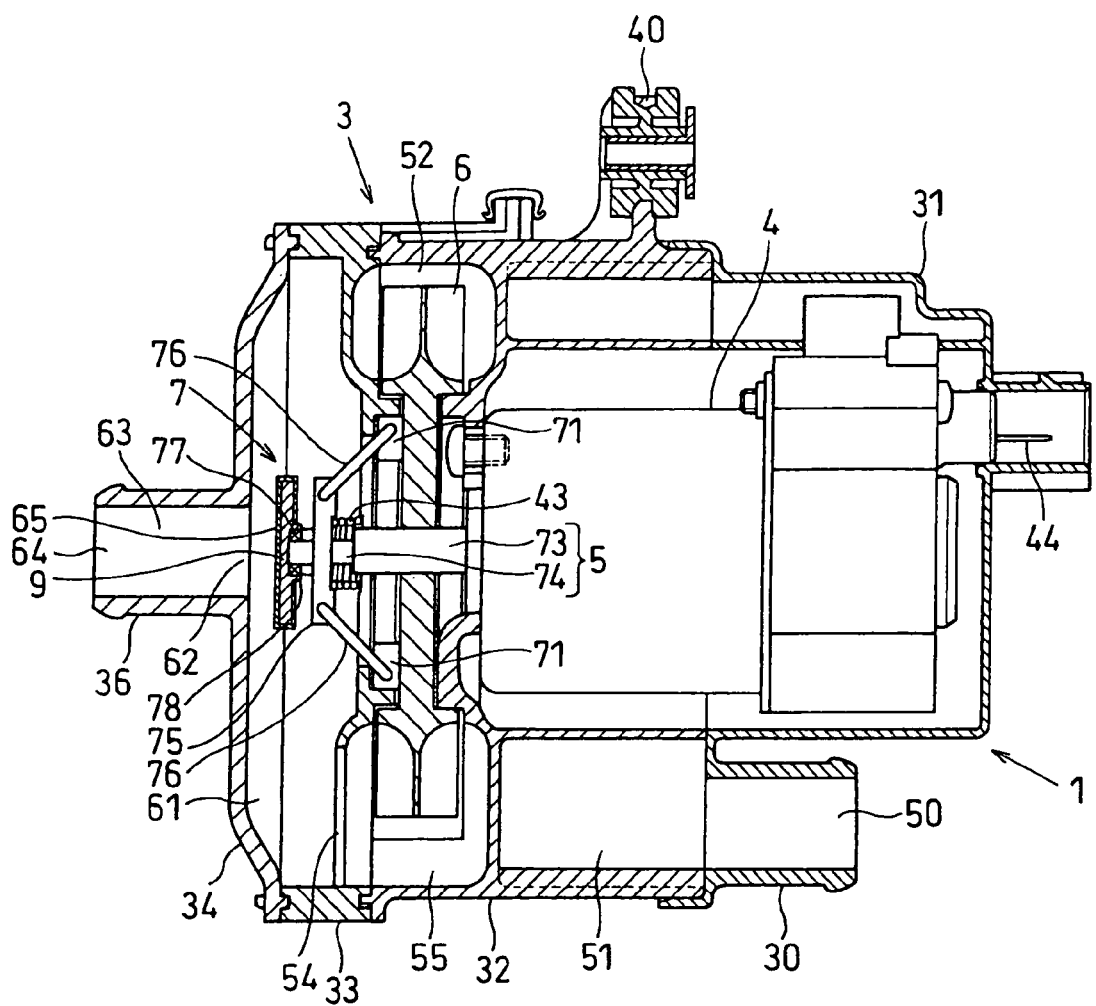
FIG. 11 is a cross section showing an opening state of a valve in a seventh embodiment of the present invention.
Figure 12:
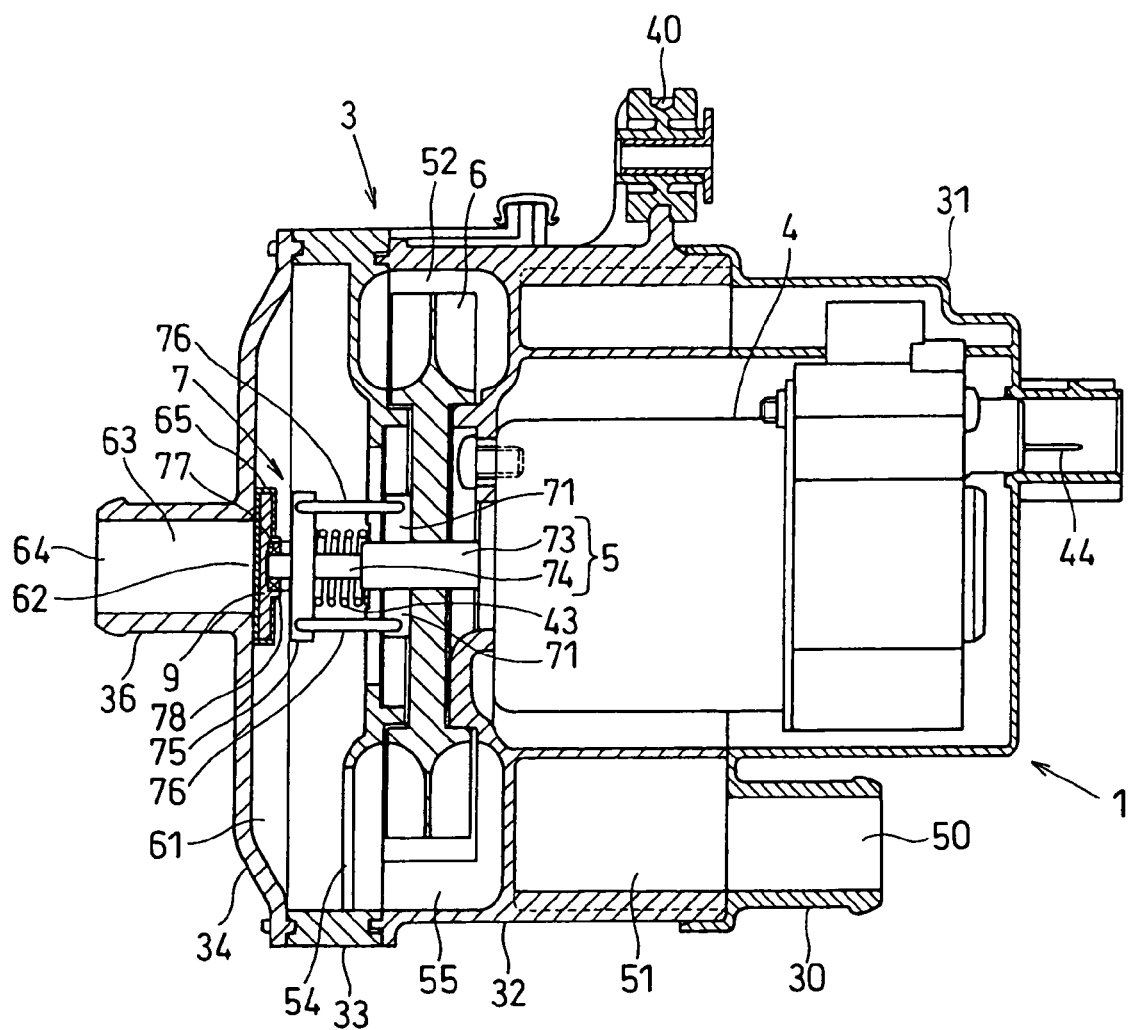
FIG. 12 is a cross section showing a closing state of the valve in a seventh embodiment of the present invention.

FIGS. 11 and 12 show a seventh embodiment of the present invention and are a cross section showing an electric air pump unit.

The electric air pump unit 1 in the seventh embodiment is, in the same way as the first to the fifth embodiment, incorporated in the secondary air supply system or the evaporation fuel treatment system. The electric air pump unit 1 is integral with the electric air pump 3 and the self-opening type valve 9 utilizing the centrifugal force, and is covered with four cases (first case 31 to fourth case 34 in that order from the right side in FIG. 11) incorporating components therein. The first case 31 to the fourth case 34 are connected by a fastening screw, a clip, an engagement piece or the like.

The motor shaft 5 in the seventh embodiment is a slide shaft composed of an outer shaft 73 connected to a rotor of the electric motor 4 and an inner shaft 74 disposed movably and helically splined to the outer shaft 73. A front end of the outer shaft 73 in the axial direction is rotatably supported an opening disposed in the third case 33 through a bearing component (not shown). However, in the seventh embodiment, a motor-side shaft is set as the outer shaft 73 and a valve-side shaft is set as the inner shaft 74, but the motor-side shaft may be set as the inner shaft 74 and the valve-side shaft may be set as the outer shaft 73. In addition, The valve drive apparatus for driving and opening the valve 9 (or driving and closing) is composed of at least the electric motor 4, the motion-direction conversion mechanism 7 converting the rotary motion of the motor shaft into the reciprocal, linear motion or the like.

The pump chamber 52 is defined inside the second case 32 and the third case 33 for rotatably receiving the impeller 6 fixed to an outer periphery of the motor shaft 5. The tubular, inlet-side flow pipe 30 is disposed in the first case 31 and the air suction opening (inlet port 50) for introducing air into the air duct 51 is formed in the inlet-side flow pipe 30. A filter may be provided in the air duct 51.

The pump suction opening is formed in the second case 32 for suctioning air from the air duct 51 into the pump chamber 52. The pump discharge opening 54 is formed in the third case 33 for discharging the air stream from the pump chamber 52. A section plate 55 is provided between the second case 32 and the third case 33 for preventing direct flow of air from the pump suction opening to the pump discharge opening 54. The tubular, outlet-side flow pipe 36 is provided in the fourth case 34 and an air discharge opening (outlet port 64) is formed in the outlet-side flow pipe 36.

The motion-direction conversion mechanism 7 in the seventh embodiment is a link type power transmission mechanism (motion-direction conversion mechanism) formed of a plurality of weights 71 which expand toward a radial, outer diameter side upon receiving a centrifugal force, a slide rotor (rotational body) 75 integrally fixed on an outer periphery of the inner shaft 74 of the motor shaft (slide shaft) 5, a plurality of link members 76 connecting the plurality of weights 71 to the slide rotor 75, a ball bearing (roll bearing) 77 rotatably supporting the inner shaft 74 or the slide rotor 75 at its axis and the like.

When the plurality of the link members 76 perform a rotary motion by rotary motion of the slide rotor 75 and the centrifugal force acts on the plurality of the weights 71 by the rotary motion of the plurality of the link members 76, the weights 71 are guided in the radial guide grooves (not shown) of the impeller 6 to travel toward the radial, outer diameter side perpendicular to the center axis direction (rotation center axis direction (axial direction) of the motor shaft 5) of the electric air pump 3. In addition, the plurality of the weights 71 rotate in synchronization with the impeller 6. That is, the weight 71 is a cuboid-like or a cube-like component, which, upon receiving the centrifugal force by the rotary motion of the electric air pump 3, travels toward the radial, outer diameter side. The weight 71 converts the rotary motion of the slide rotor 75 into the linear motion by use of the centrifugal force.

In addition, the plurality of the weights 71, upon receiving the centrifugal force by the rotary motion of the slide rotor 75 and the plurality of the link members 76, provide the slide rotor 75 with a linear motion amount in accordance with a radial travel amount toward the radial, outer diameter side. The plurality of the weights 71 are arranged in such a way that as a rotational speed of the electric air pump 3 or a rotational speed (motor rotational speed per unit hour) of the motor shaft 5 increases, the centrifugal force acting on the weight 71 increases, thereby increasing a travel amount in the radial direction of the weight 71. The guide groove may be spirally formed on a surface (surface on which the plurality of the weights 71 slide and contact) of the third case 33. The guide groove may not be disposed.

The slide rotor 75 is a circular component which is movably provided in the axial direction of the motor shaft 5 to rotate integrally with the motor shaft 5. The plurality of the link members 76 are bar-like components which connect the outer periphery part of the slide rotor 75 to the plurality of the weights 71. The link members 76 are cylindrically located at the circumference of the motor shaft 5 by a predetermined interval (for example, equal interval). The inner shaft 74 and the slide rotor 75 are arranged in such a way that as the travel amount of the weights 71 in the radial direction increases, a linear motion amount (lift amount) of the inner shaft 74 and the slider 72 toward one side (opening direction of the valve 9) in the axial direction of the motor shaft 5 increase.

Further, a first restriction surface is provided on then outer periphery part of the motor shaft 5. When the weights 71 travel toward a radial, inner diameter side of the motor shaft 5, the first restriction surface restricts further travel of the weights toward the radial, inner diameter side. A second restriction surface is provided on an inner periphery part of the third case 33 defining the pump chamber 52. When the weights 71 travel toward an outer diameter side in the diameter of the motor shaft 5, the second restriction surface restricts further travel of the weights toward the radial, outer diameter side.

The ball bearing 77 includes rolling bodies such as balls rolling on a track surface disposed on an inner periphery of an outer race and on a track surface disposed on an outer periphery of an inner race. The ball bearing 77 rotates the inner shaft 74 and the slide rotor 75 relative to the valve 9 which does not rotate. An inner periphery part of a cylindrical part 78 extending in the other side (motor side) in the axial direction from a rear wall surface of the valve 9 is fixed to an outer periphery part of the outer race of the ball bearing 77 by press-fit. A front end outer periphery part of the inner shaft 74 extending in one side (valve side) in the axial direction from the slide rotor 75 is fixed to an inner periphery part of the inner race of the ball bearing 77 by press-fit.

The valve 9 in the seventh embodiment opens/closes an air-passing opening (round valve bore) 62 for communicating the airflow path (valve chamber) 61 formed between the third case 33 and the fourth case 34 with the airflow path 63 formed in the outlet-side flow pipe 36. A seal rubber 65 is attached on a surface of the valve 9 by baking for air-tightly sealing the valve bore 62, when the valve 9 is seated at a circular valve seat (valve seat of the fourth case 34) disposed in a surrounding area of the valve bore 62. In addition, one end of the coil spring 43 in the axial direction is retained by a spring hook of the slide rotor 75 and the other end of the coil spring 43 in the axial direction is retained by a spring hook of the impeller 6.

Next, an operation of the electric air pump unit 1 in the seventh embodiment will be briefly explained with reference to FIGS. 11 and 12. FIG. 11 is a cross section showing an opened condition of the valve 9. FIG. 12 is a cross section showing a closed condition of the valve 9.

The ECU 10 rotates the motor shaft 5 in the forward direction at a predetermined rotational speed. As a result, the impeller 6 rotates by the motor torque of the outer shaft 73 (the electric air pump 3 is ON). That is, air is taken from the inlet port 50 caused by rotary motion of the electric air pump 3, thereby generating the pump positive pressure in the electric air pump inside (the air duct 51, the pump chamber 52 and the airflow path 61). The inner shaft 74 helically splined to the outer shaft 73 rotates by the rotary motion of the motor shaft 5.

In addition, the slide rotor 75 fixed integrally with an outer periphery of the inner shaft 74 rotates by the rotary motion of the inner shaft 74. The plurality of the link members 76 rotate by the rotary motion of the slide rotor 75. The plurality of the weights 71 travel in the radial guide grooves toward a radial, outer diameter side of the motor shaft 5 by the centrifugal force developed by a rotary motion of the plurality of the link members 76 while rotating in synchronization with the impeller 6.

The inner shaft 74 and the slide rotor 75 travel toward one side in the axial direction of the motor shaft 5 in accordance with a radial, travel amount of the plurality of the weights 71. Thereby, since the inner race of the ball bearing 77 fixed to the slide rotor 75 perform the linear motion, the valve 9 fixed to the outer race of the ball bearing 77 also performs the linear motion. At this point, as the radial travel amount of the weights 71 increases, a linear motion amount (lift amount) of the valve 9 toward the other side (opening direction of the valve 9) in the axial direction of the motor shaft 5 increases.

Accordingly, since the valve 9 is driven and opened by the rotary motion of the electric air pump 3, as shown in FIG. 11, the valve bore 62 is opened (opened condition of the valve 9). This produces an air stream going from the airflow path 61 to the outlet port 64 via the valve bore 62 and the airflow path 63 caused by the rotary motion of the electric air pump 3.

Thereafter, when the supply of electric power to the electric motor 4 stops, the rotation of the electric motor 5 stops (the electric motor 3 is OFF). Then, the valve 9, the slide rotor 75, the ball bearing 77 and the like travel toward one side (closing direction of the valve 9) in the axial direction by an urging force of the coil spring 43 and, as shown in FIG. 12, the valve 9 is seated at the valve seat to close the valve bore 62 (closed condition of the valve 9).

As described above, the electric air pump unit 1 in the seventh embodiment can achieve the effect similar to that of the sixth embodiment.

Eighth Embodiment

Figure 13:
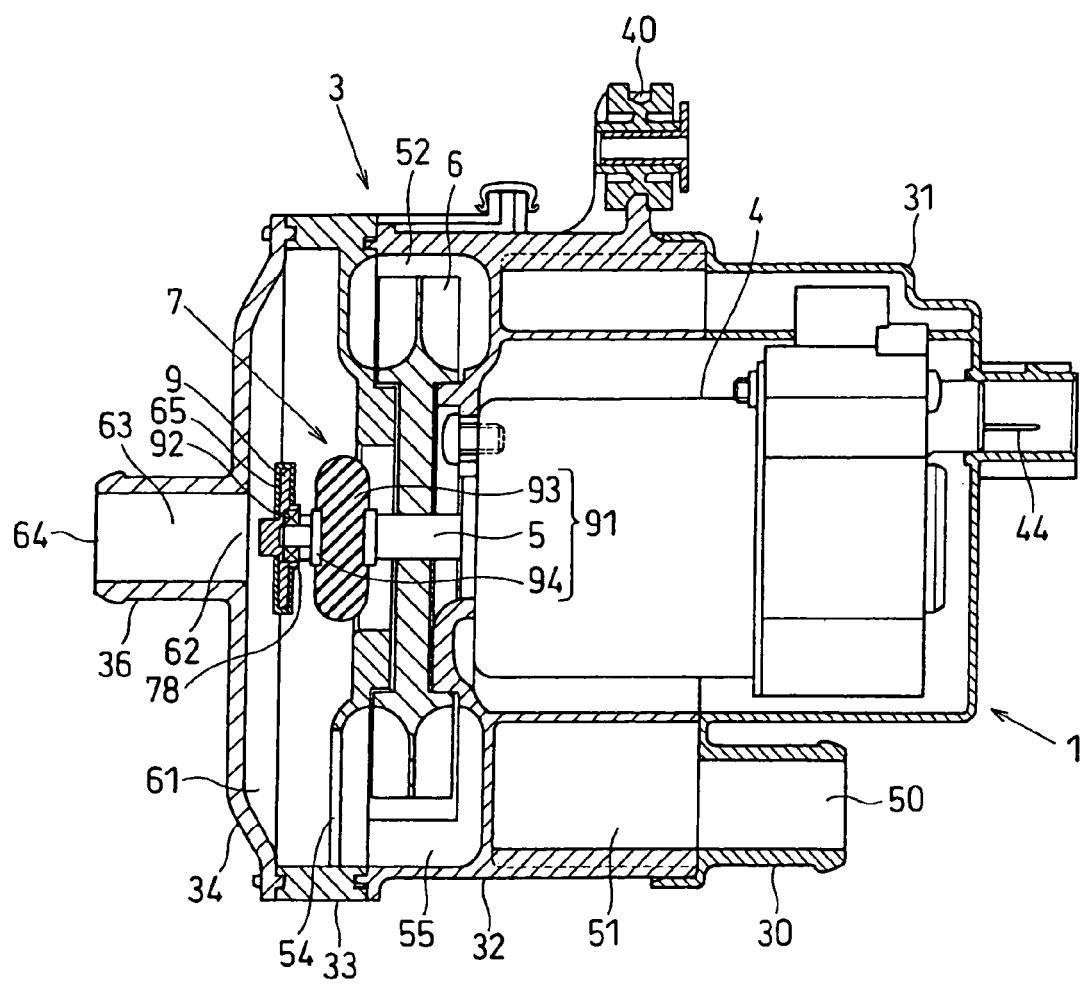
FIG. 13 is a cross section showing an opening state of a valve in an eighth embodiment of the present invention.
Figure 14:
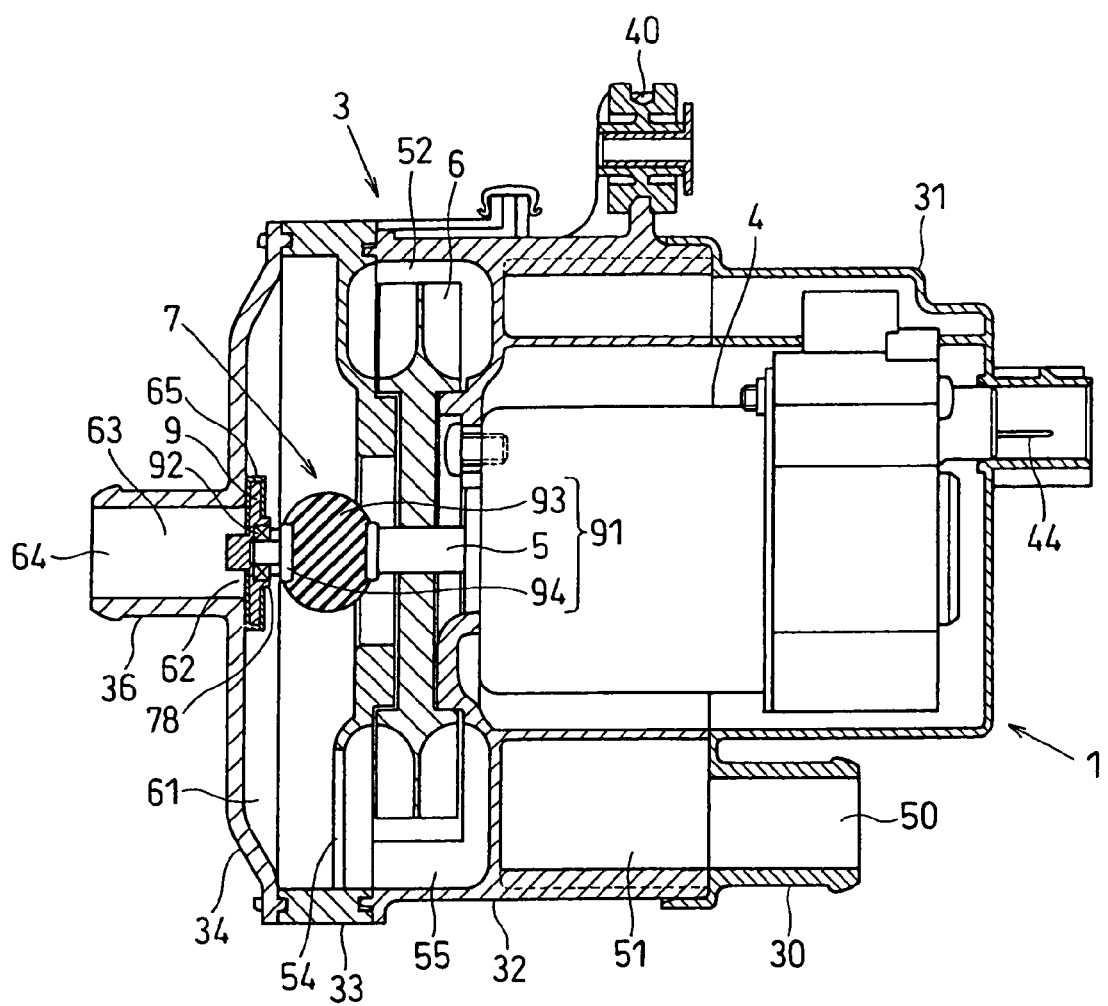
FIG. 14 is a cross section showing a closing state of the valve in an eighth embodiment of the present invention.

FIGS. 13 and 14 show an eighth embodiment of the present invention and are a cross section showing an electric air pump unit.

The electric air pump unit 1 in the seventh embodiment is, in the same way as the first to the fifth embodiment, incorporated in the secondary air supply system or the evaporation fuel treatment system. A rotational shaft of the electric air pump 3 in the eighth embodiment is provided with the motion-direction conversion mechanism 7 converting the rotary motion of the electric air pump 3 into the linear motion. The motion-direction conversion mechanism 7 is a rubber type power transmission mechanism (motion-direction conversion mechanism) composed of an extensible shaft 91 as a rotational shaft of the electric air pump 3 and a ball bearing (rolling bearing) rotatably supporting the extensible shaft 91 at its axis.

The extensible shaft 91 is formed of the rotational shaft of the electric air pump 3, that is, the motor shaft (motor-side shaft) 5, a rubber resilient body for contracting or expanding the extensible shaft 91 in the axial direction and a valve-side shaft 94 for connecting the ball bearing 92 to the rubber resilient body 93. A collar-like rubber retaining part on the surface of which the rubber resilient body 93 is molded is provided on the front end of the motor shaft 5 in the axial direction. A collar-like rubber retaining part on the surface of which the rubber resilient body 93 is molded is provided on a rear end of the valve-side shaft 94 in the axial direction.

The rubber resilient body 93 is a spherical body-like or a spherical surface body-like rubber product and a surface thereof is applied or coated with silicon resin for preventing deterioration of the rubber at the surrounding atmosphere.

In addition, rubber resilient body 93, upon receiving the centrifugal force by rotary motion of the extensible shaft 91, is resiliently deformed in the axial direction (compressive deformation). The rubber resilient body 93 provides the ball bearing and the valve-side shaft 94 with a linear motion amount in accordance with a compression deformation amount in the axial direction.

The rubber resilient body 93 is arranged in such a way that as a rotational speed of the electric air pump 3 or a rotational speed (motor rotational speed per unit hour) of the motor shaft 5 increases, the centrifugal force increases, thereby increasing a compression deformation amount of the body 93 in the axial direction.

The ball bearing 92 rotates the valve-side shaft 94 in a relative relation with the valve 9 which does not rotates. An inner periphery part of a cylindrical part 78 extending in the other side (motor side) in the axial direction from a rear wall surface of the valve 9 is fixed to an outer periphery part of the outer race of the ball bearing 92 by press-fit. The valve-side shaft 94 is fixed to an inner periphery part of the inner race of the ball bearing 92 by press-fit.

Next, an operation of the electric air pump unit 1 in the eighth embodiment will be briefly explained with reference to FIGS. 13 and 14. FIG. 13 is a cross section showing an opened condition of the valve 9. FIG. 14 is a cross section showing a closed condition of the valve 9.

The ECU 10 rotates the motor shaft 5 in the forward direction at a predetermined rotational speed. As a result, the impeller 6 rotates by the motor torque (the electric air pump 3 is ON). That is, air is taken from the inlet port 50 caused by the rotary motion of the electric air pump 3, thereby generating the pump positive pressure in the electric air pump inside (the air duct 51, the pump chamber 52 and the airflow path 61). The centrifugal force acts on the rubber resilient body 93 located in the extensible shaft 91 caused by the rotary motion of the electric air pump 3, so that the rubber resilient body 93 is resiliently deformed (compression deformation) in the axial direction.

Hereby, the rubber resilient body 93 provides a linear motion to a rotary motion of the valve-side shaft 94. Thereby, since the inner race of the ball bearing 92 fixed to the valve-side shaft 94 performs the linear motion, the valve 9 fixed to the outer race of the ball bearing 92 also performs the linear motion. At this point, as the compression deformation amount of the rubber resilient body 93 in the radial direction increases, a linear motion amount (lift amount) of the valve 9 toward the other side (opening direction of the valve 9) in the axial direction of the motor shaft 5 increases.

Accordingly, since the valve 9 is driven and opened by the rotary motion of the electric air pump 3, as shown in FIG. 13, the valve bore 62 is opened (opened condition of the valve 9). This produces an air stream going from the airflow path 61 to the outlet port 64 via the valve bore 62 and airflow path 63 caused by the rotary motion of the electric air pump 3.

Thereafter, when the supply of electric power to the electric motor 4 stops, the rotation of the motor shaft 5 stops (the electric air pump 3 is OFF). Then, the centrifugal force acting on the rubber resilient body 93 is eliminated and therefore, the rubber resilient body 93 is resiliently deformed (expansion deformation) in the axial direction. Hereby, the valve 9, the ball bearing 92, the valve-side shaft 94 and the like travel toward one side (closing direction of the valve 9) and, as shown in FIG. 14, the valve 9 is seated at the valve seat to close the valve bore 62 (closed condition of the valve 9).

Herein, in a case of using the electric air pump unit 1 in the eighth embodiment for the evaporation fuel treatment system, since silicon resin is applied or coated on the surface of the rubber resilient body 93, the rubber resilient body 93 does not deteriorate in durability even if exposed to evaporation fuel.

Ninth Embodiment

Figure 15:
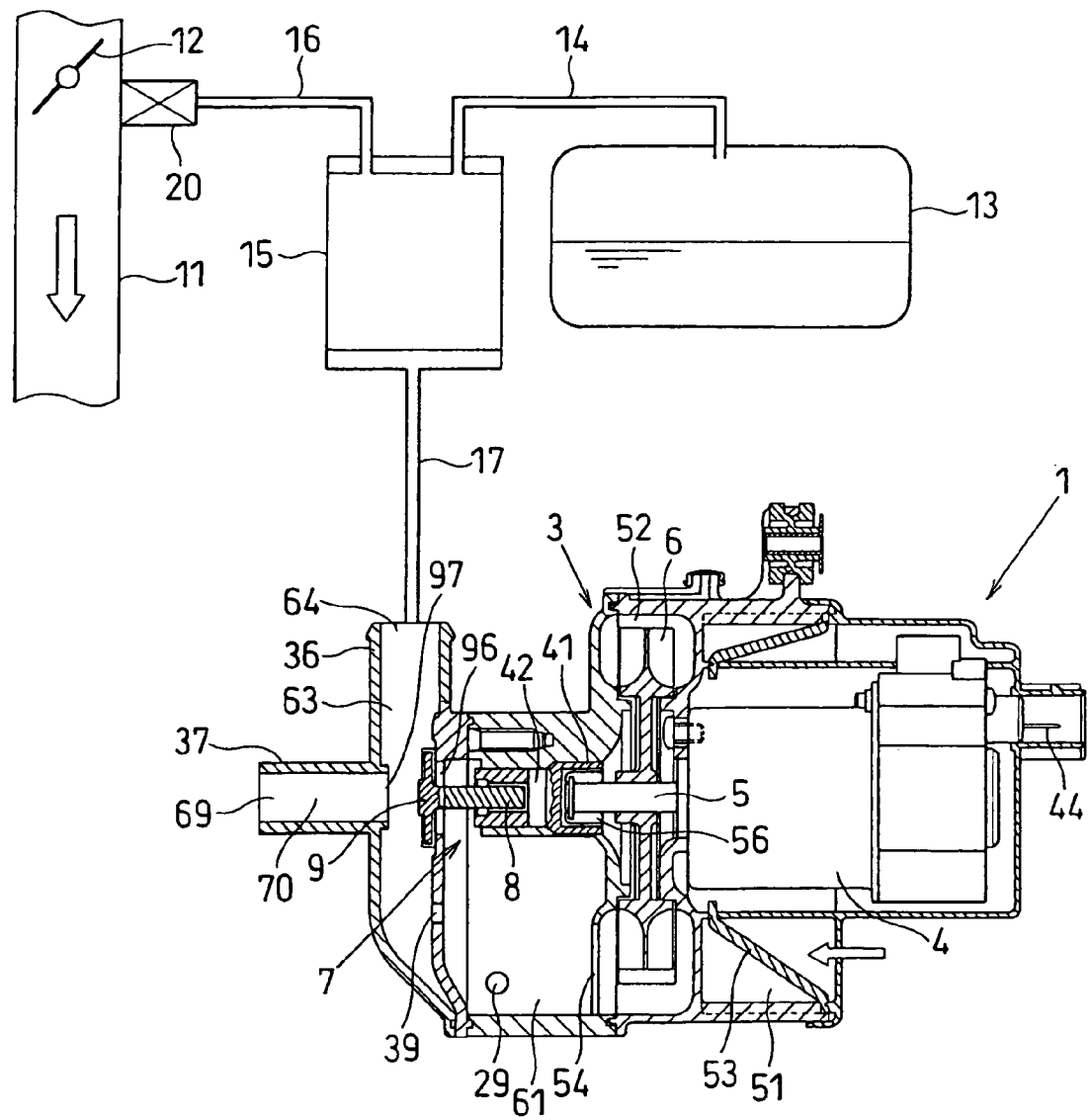
FIG. 15 is a schematic diagram showing an entire arrangement of an evaporation fuel treatment system in a ninth embodiment of the present invention.
Figure 16:
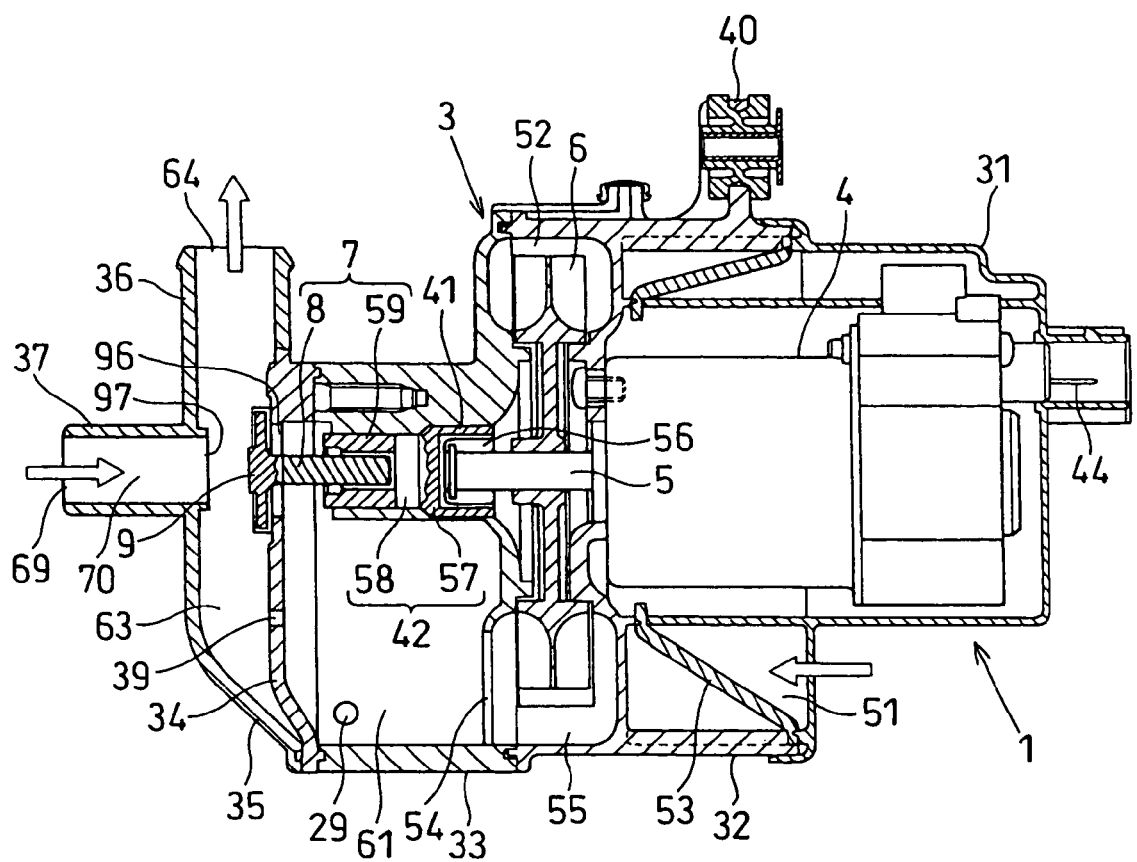
FIG. 16 is a cross section showing an entire arrangement of an electric air pump unit in a ninth embodiment of the present invention.

FIGS. 15 to 23 show a ninth embodiment of the present invention. FIG. 15 is a block diagram showing an entire arrangement of an evaporation fuel treatment system. FIG. 16 is a cross section showing an electric air pump unit.

The electric air pump unit 1 in the ninth embodiment is, in the same as the fifth embodiment, is incorporated in the evaporation fuel treatment system. The air-opening pipe 17 is connected to an air-opening bore of the canister 15. The electric air pump unit 1 is connected to an upper stream end of the air-opening pipe 17 in the airflow direction. An airflow path is formed in the air-opening pipe 17 for introducing the air stream generated by operating the impeller 6 into the canister 15. An airflow path (evaporation fuel flow path) is formed in the airflow pipe 16 for introducing the evaporation fuel adsorbed in the canister 15 into the engine intake pipe 11 via the purge VSV 20. The purge VSV 20 is fixed by a fastening bolt or the like to the engine intake pipe 11, particularly to a throttle body positioned in the downstream side (intake port side) of the throttle valve 12 in the intake airflow direction.

In the ninth embodiment, the impeller 6 integral with the self-opening type valve 9 is used as a purge pump for forcibly purging the evaporation fuel into the engine intake pipe 11. The mount-stay 40 of the second case 32 in the electric air pump unit 1 is clamped and fixed to the canister 15 by a fastening bolt or the like. An air suction opening of the first case 31 serves as a first air suction opening (air suction opening at purging) for taking the air into an air duct 51 including a filter 53 therein.

Herein, the filter 53 incorporated in the air duct 51 allows the passing of airflow from the air suction opening of the first case 31 but traps foreign matters mixed in the air, thereby preventing the entering of the foreign matters into the engine intake pipe 11. A pressure sensor 29 is provided in the airflow path 61 formed between the third case 33 and the fourth case 44 for detecting a pressure in the airflow path 61. The outlet-side flow pipe 36 connected air-tightly to the air-opening pipe 17 is provided in the fifth case 35 and also the inlet-side flow pipe 37 is provided co-axially with the valve bore 62 therein. An air discharge opening (outlet port 64) communicated with an airflow path of the air-opening pipe 17 is formed in the outlet-side flow pipe 36.

A second air suction opening (air suction opening at reference operating time and at pump cease time) 69 is formed in the inlet-side flow pipe 37. A reference orifice 39 is formed in parallel with the valve bore 62 in the fourth case 34. The reference orifice 39 is a reference hole (for example, a diameter of 0.35 to 0.60 mm, preferably 0.40 to 0.50 mm, most preferably 0.45 mm) located for measuring a reference pressure used for leak check (leak determination). A first circular valve seat having a first valve bore 96 therein is provided in the fourth case 34 and a second circular valve seat having a second valve bore 97 therein is provided in the fifth case 35.

The first valve bore 96 is an air passing opening communicating the airflow path 61 with the airflow path 63.

The second valve bore 97 is an air passing opening communicating the airflow path 70 of the inlet-side flow pipe 37 with the airflow path 63. The valve 9 in the ninth embodiment is a poppet type valve for opening/closing the first and second valve bores 96 and 97 and is provided in a collar shape at one end of the valve shaft 8 in the axial direction. Hereby, when the valve 9 is driven to be opened, the valve 9 is unseated from the first valve seat and then, seated at the second valve seat to fully open the first valve bore 96 and fully close the second valve bore 97. On the other hand, when the valve 9 is driven to be closed, the valve 9 is unseated from the second valve seat and then, seated at the first valve seat to fully open the second valve bore 97 and fully close the first valve bore 96.

The ECU 10 is provided with a known microcomputer, which is arranged to include functions of a CPU for carrying out control processing and calculating processing, a memory unit (involatile memory such as an EEPROM, volatile memory such as a ROM or a RAM) for storing various programs and data and the like. When an ignition switch is ON to start an operation of the engine E, the ECU 10 adjusts supply power supplied to the electric motor 4 based upon the control program stored in the memory, thereby controlling a rotary motion (for example, rotational speed or rotational direction) of the motor shaft 5.

The ECU 10 is arranged in such a way that an output value (pressure signal) outputted from the pressure signal 29 located in the electric air pump unit 1, sensor signals from other various sensors and switch signals from switches located in a vehicle such as an automobile are converted analog to digital by an A/D converter and thereafter, are inputted to the microcomputer housed in the ECU 10. A crank angle sensor for detecting a rotational angle (crank angle) of the crank shaft of the engine E, an accelerator pedal position sensor for detecting a depressing amount (accelerator position) of an accelerator pedal 104 of a driver, a throttle position sensor for detecting an opening of a throttle valve 12, a water temperature sensor for detecting an engine water temperature and the like are connected to an input circuit of the microcomputer.

Figure 17:
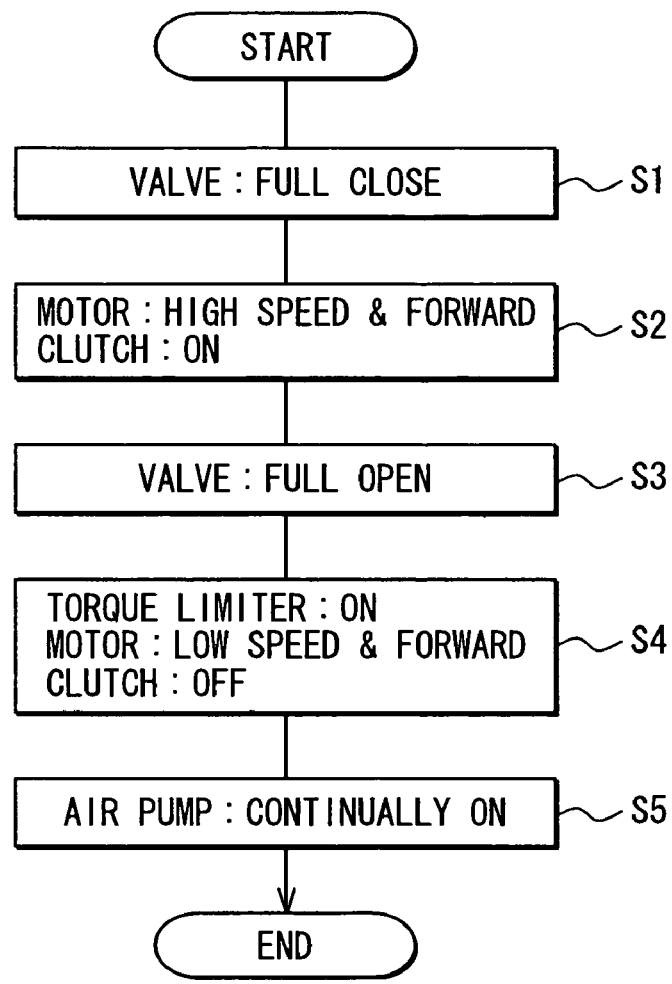
FIG. 17 is a flow chart showing a method of forcibly purging evaporation fuel in a ninth embodiment of the present invention.
Figure 18:
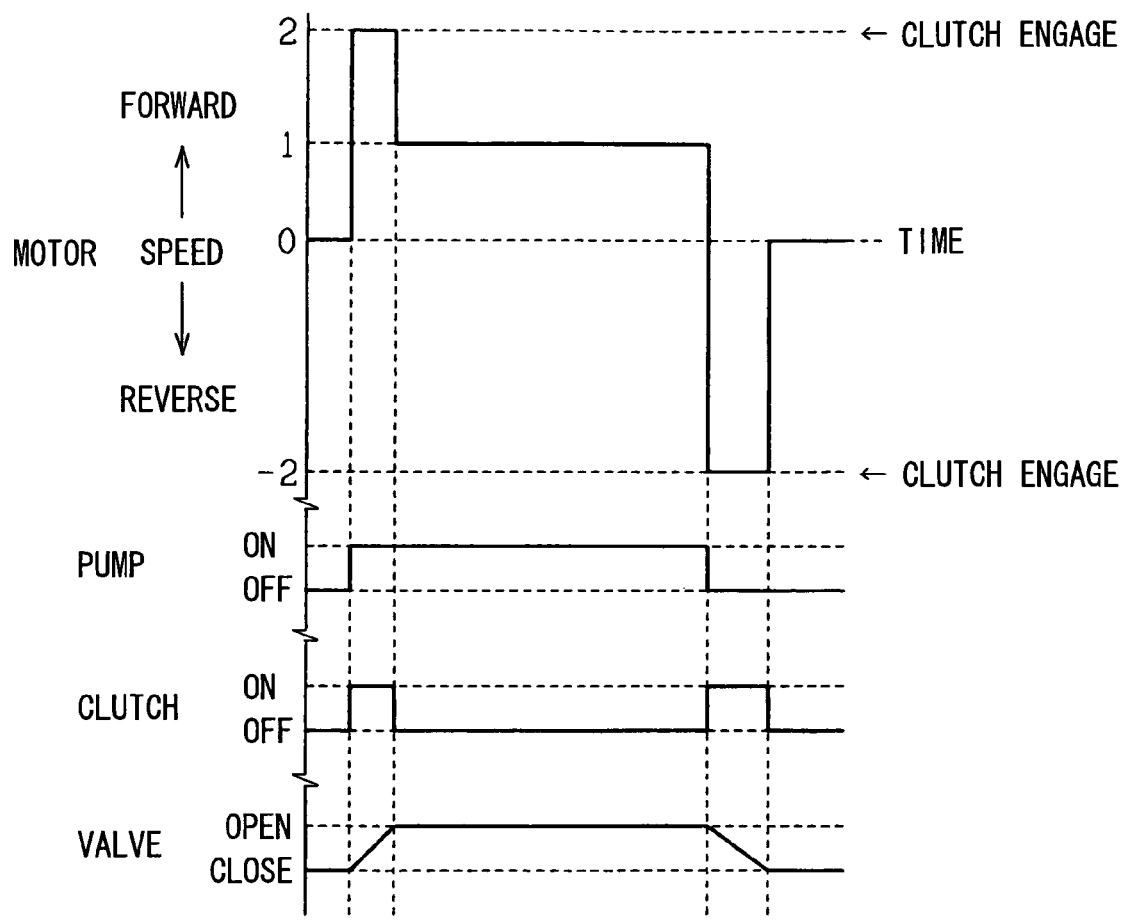
FIG. 18 is a timing chart showing a motor operation, a pump operation, a centrifugal clutch and a valve operation in a ninth embodiment of the present invention.
Figure 19:
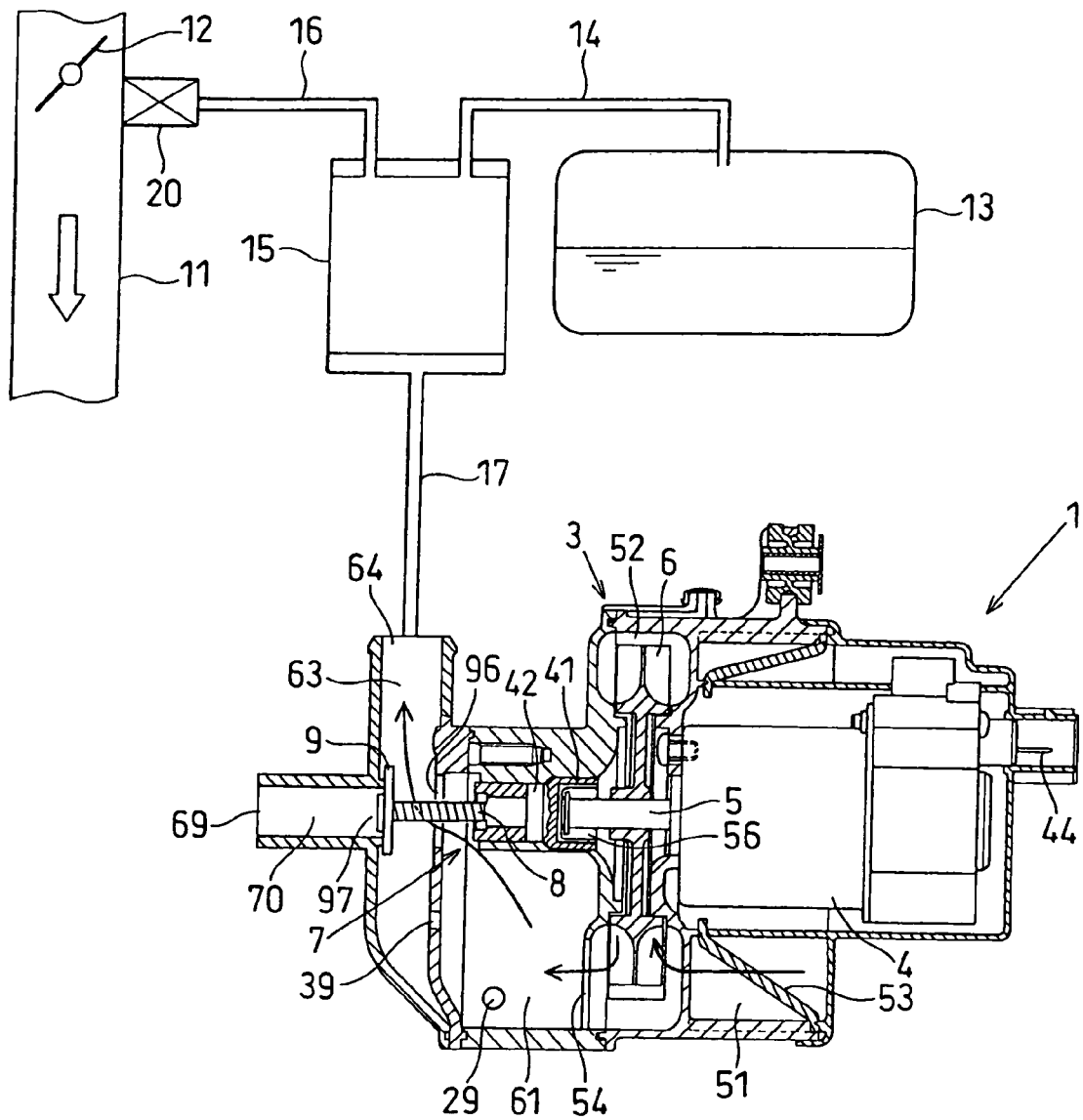
FIG. 19 is an explanatory diagram showing a purge operation of the evaporation fuel treatment system in a ninth embodiment of the present invention.

Next, a control method of an evaporation fuel treatment system in the ninth embodiment will be briefly explained with reference with FIGS. 17 to 23. First, a method of forcibly purging evaporation fuel adsorbed in the canister 15 into an intake manifold (engine intake pipe 11) of the engine E is shown in FIGS. 17 to 19. Herein, FIG. 17 is a flow chart showing a method of forcibly purging evaporation fuel. The control routine in FIG. 17 is executed for each predetermined timing after an ignition switch is ON.

The ECU 10 first opens the purge VSV 20 during the operating of the engine E. Hereby, an intake pipe vacuum of the engine E reaches the purge port of the canister 15. Next, the contact type touch sensor, the non-contact type position sensor or the like detects a fully closed condition of the valve 9 (full-closing valve-detecting means: step S1).

Next, the ECU 10, as shown in a timing chart in FIG. 18, rotates the motor shaft 5 in the forward direction at a high rotational speed (step S2). As a result, the impeller 6 rotates by the motor torque (the electric air pump 3 is ON). That is, air is taken from the inlet port caused by rotation of the electric air pump 3, thereby generating the pump positive pressure in the electric air pump inside (the air duct 51, the pump chamber 52 and the airflow path 61). At this point, since the motor shaft 5 rotates in the forward direction at a high rotational speed, a centrifugal force acts on the plurality of the clutch weights 56 to turn on the centrifugal clutch 41 (complete clutch). When the centrifugal clutch 41 is ON, the motor torque is transmitted to the valve shaft 8 via the torque limiter 42 and the motion-direction conversion mechanism 7, thus providing a linear motion of the valve shaft 8. This causes the valve 9 retained and fixed to the valve shaft 8 to be driven and opened, thereby opening the first valve bore 96 and closing the second bore 97 (fully opened condition of the valve 9).

Next, the ECU 10 detects the fully opened condition of the valve 9 by a contact type touch sensor, a non-contact position sensor or the like (full-opening valve-detecting means: step S3). In addition, when the valve 9 is in a fully opened condition, since excessive load torque acts on the torque limiter 42 and the motion-direction conversion mechanism 7, the friction plate 57 of the centrifugal clutch side slides on the friction surface of the friction plate 58. That is, torque limiter 42 is ON. Next, the ECU 10, as shown in a timing chart in FIG. 18, rotates the motor shaft 5 in the forward direction at a low rotational speed (step S4). In this case, since the centrifugal force acting on the plurality of the clutch weights 56 becomes smaller, the centrifugal clutch 41 is OFF.

Next, the ECU 10 rotates the motor shaft 5 in a forward direction at a low rotational speed, continually performing an ON operation of the electric air pump 3 (step S5). As a result, since the fully opened condition of the valve 9 is maintained as shown in FIG. 19, a positive pressure (pressure greater than the intake pipe vacuum and the atmosphere pressure) is generated in the airflow path of the air-opening pipe 17 by rotary motion of the impeller 6. Then, the positive pressure reaches the air-opening bore of the canister 15 and therefore, the air stream, which goes from the air-opening bore of the canister 15 to the purge port is generated. When such air stream is generated, desorption occurs in the evaporation fuel adsorbed in the adsorbent in the canister 15. Accordingly, when the intake valve is opened during the operating of the engine E, the impeller 6 is driven and rotated by the motor shaft 5 to open the valve 9, thereby purging the evaporation fuel adsorbed in the adsorbent in the canister 15 into the combustion chamber of the engine E through the engine intake pipe 11 and the intake port.

Further, the ECU 10, as shown in a timing chart in FIG. 18, rotates the motor shaft 5 in the reverse direction at a high rotational speed at a point when a predetermined time elapses after the purge operation by the electric air pump 3 starts (the electric air pump 3 is OFF). This causes the valve 9 to be driven and closed, therefore closing the first valve bore 96 and opening the second valve bore 97. Thereafter, when supply of electric power to the electric motor 4 stops, rotation of the motor shaft 5 stops. As a result, the purge operation by the electric air pump 3 ends.

Next, the ECU 10, as shown in a time chart in FIG. 18, stops supply of electric power (pump drive current) to the electric motor 4 by detecting the fully closed condition of the valve 9 with a contact type touch sensor or a non-contact type position sensor or the like. Hereby, since the rotary motion of the impeller 6 stops and the valve 9 is in a fully closed condition, the purge operation by the electric air pump unit 1 ends.

Figure 20:
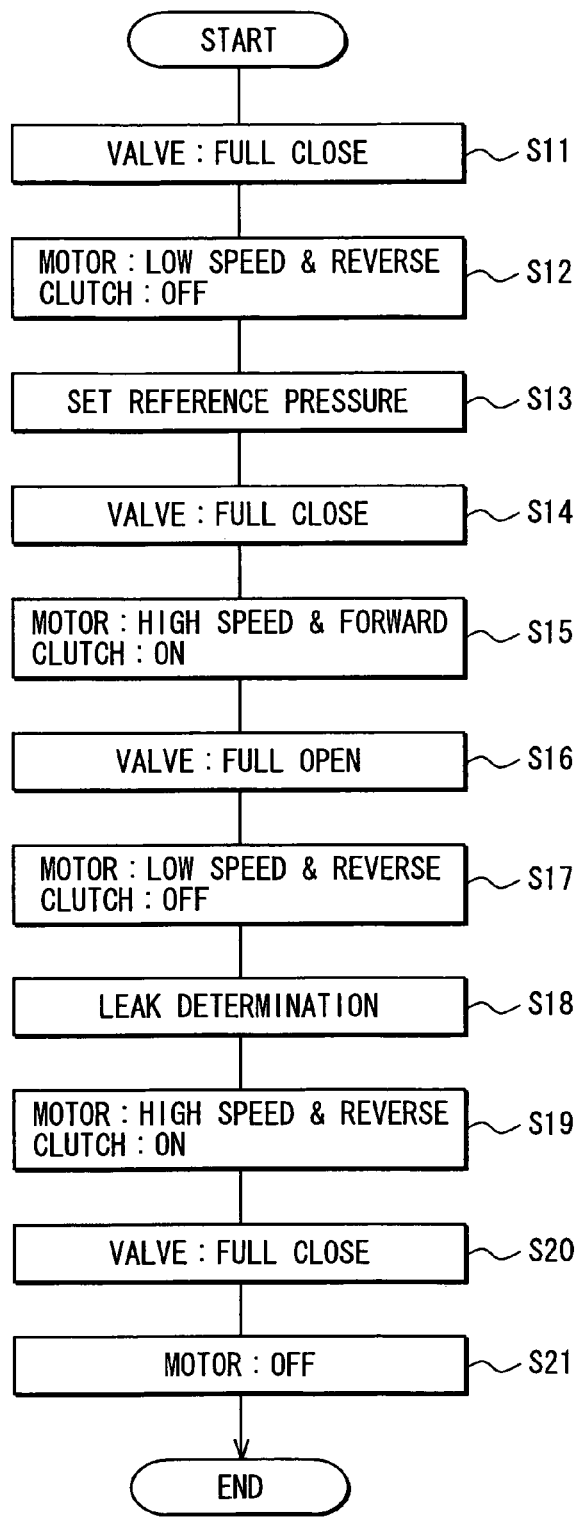
FIG. 20 is a flow chart showing a method of performing leak check in a closed space of the evaporation fuel treatment system in a ninth embodiment of the present invention.

Next, a method of performing leak check in a closed space of the evaporation fuel treatment system is shown in FIGS. 20 to 23. Herein, FIG. 20 is a flow chart showing a method of performing leak check in a closed space of the evaporation fuel treatment system. The control routine in FIG. 20 is executed for each predetermined timing after the ignition switch is ON. Alternatively after the ignition switch is OFF, the routine is executed at a point when a predetermined condition is met. For example, at a point when a predetermined time elapses after the engine stops, the routine is executed. It is possible to execute it in a case where power supply to the microcomputer continues to be made after the ignition switch is OFF.

In a case of performing leak check in the closed space in the evaporation fuel treatment system, the ECU 10 first opens the purge VSV 20, and detects a fully closed condition of the valve 9 by the contact type touch sensor, the non-contact type position sensor or the like (full-closing valve-detecting means: step S11). Next, the ECU 10, as shown in a timing chart in FIG. 21, rotates the motor shaft 5 in the reverse direction at a low rotational speed (step S12). As a result, the impeller 6 rotates by the motor torque (the electric air pump 3 is ON). That is, the pump vacuum in the electric air pump inside (the airflow path 61, the pump chamber 52 and the air duct 51) is generated caused by rotation of the electric air pump 3. At this point, since the motor shaft 5 rotates in the reverse direction at a low rotational speed, a centrifugal force acting on the plurality of the clutch weights 56 is small, so that the centrifugal clutch 41 is OFF. Hereby, since the motor torque is not transmitted to the valve 9, the valve 9 remains to be fully closed.

Figure 22:
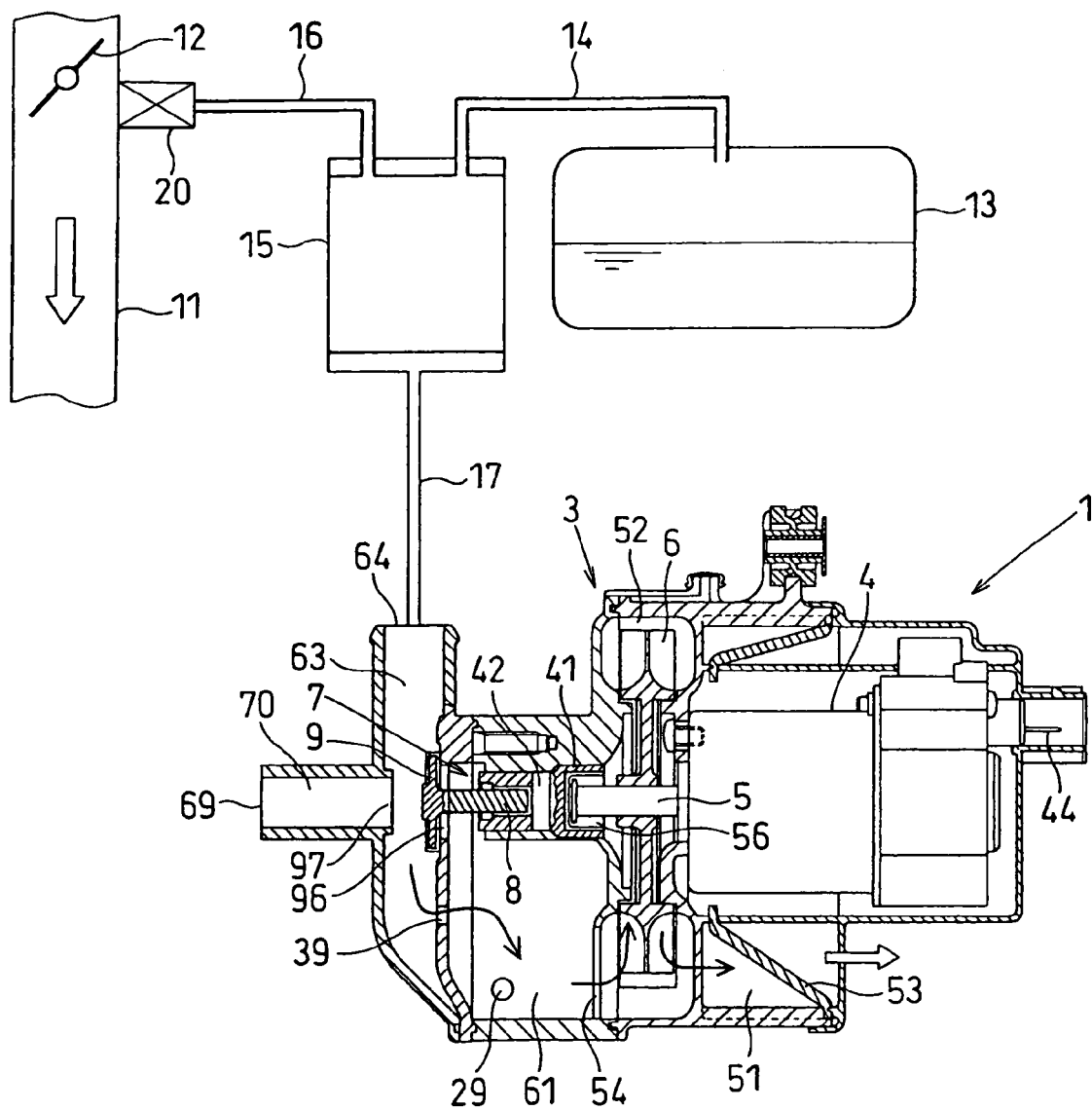
FIG. 22 is an explanatory diagram showing a reference operation of the evaporation fuel treatment system in a ninth embodiment of the present invention.

Next, an air stream is, as shown in FIG. 22, generated by reverse rotation of the impeller 6. The air stream runs from the second air suction opening 69 to the inlet port via the airflow path 70, the second valve bore 97, the airflow path 63, the reference orifice 39, the airflow path 61, the pump discharge opening 54, the pump chamber 52, the pump suction opening and the air duct 51 in that order, thereby providing the pump vacuum to the inside of the electric air pump unit 1. Next, the ECU 10 detects a pressure in the airflow path 61 by the pressure sensor 29 in this condition. The ECU 10 sets a reference pressure corresponding to the reference orifice 39 having a diameter of 0.45 mm and stores the reference pressure in the memory (pressure-setting means: step S13).

Next, in a case of performing a leak determination operation of the evaporation fuel treatment system after setting the reference pressure, the fully closed condition of the valve 9 is first detected by the contact type touch sensor, the non-contact type position sensor or the like (full-closing valve detecting means: step S14). Next, the ECU 10, as shown in a timing chart in FIG. 21, rotates the motor shaft 5 in the forward direction at a high rotational speed (step S15). As a result, the impeller 6 rotates by the motor torque (the electric air pump 3 is ON). That is, the pump positive pressure in the inside of the electric air pump (the air duct 51, the pump chamber 52 and the airflow path 61) is generated caused by rotary motion of the electric air pump 3. At this point, since the motor shaft 5 rotates in the forward direction at a high rotational speed, a centrifugal force acts on the plurality of the clutch weights 56 to turn on the centrifugal clutch 41 (complete clutch). Since the centrifugal clutch 41 is ON and thereby the valve 9 is opened, the first valve bore 96 is opened and the second valve bore 97 is closed (fully opened condition of the valve 9). Next, the ECU 10 detects the fully opened condition of the valve 9 by a contact type touch sensor, a non-contact position sensor or the like (full-opening valve detecting means: step S16).

Figure 21:
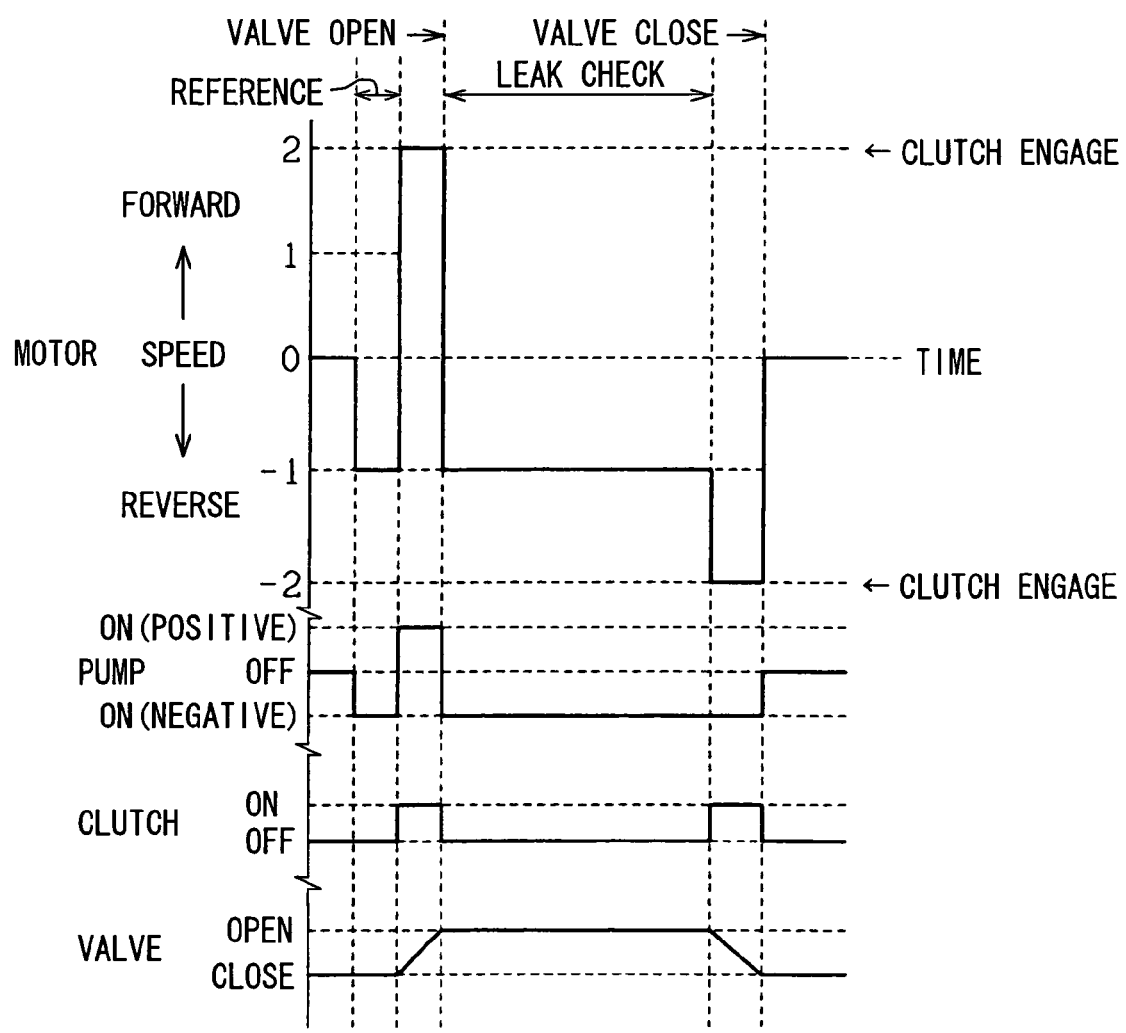
FIG. 21 is a timing chart showing a motor operation, a pump operation, a centrifugal clutch and a valve operation in a ninth embodiment of the present invention.
Figure 23:
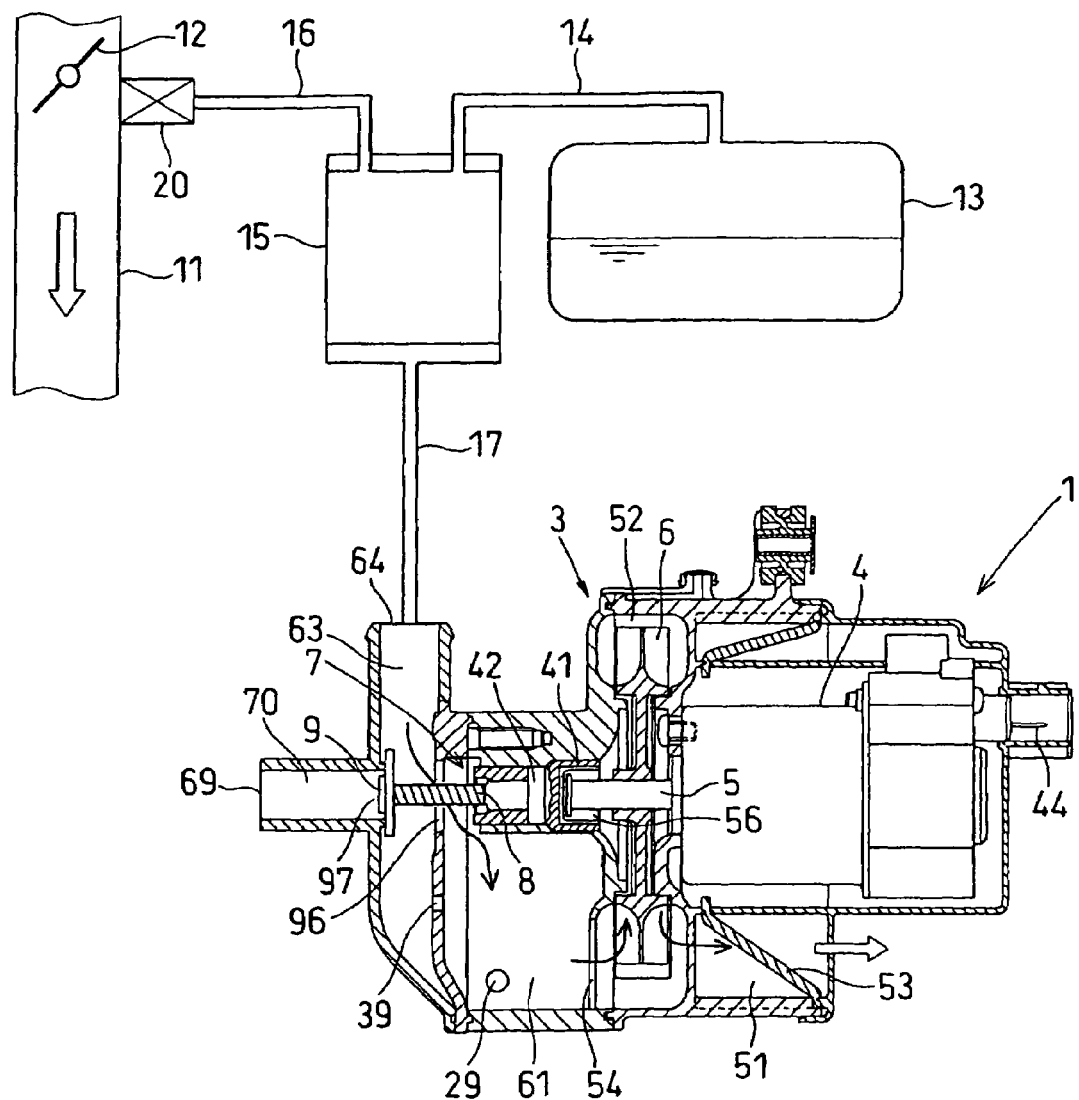
FIG. 23 is an explanatory diagram showing a leak determination operation of the evaporation fuel treatment system in a ninth embodiment of the present invention.

Next, the ECU 10, as shown in a timing chart in FIG. 21, rotates the motor shaft 5 in the reverse direction at a low rotational speed (step S17). As a result, the impeller 6 rotates by the motor torque (the electric air pump 3 is ON). That is, the pump vacuum in the inside of the electric air pump (the airflow path 61, the pump chamber 52 and the air duct 51) is generated caused by rotary motion of the electric air pump 3. At this point, since the motor shaft 5 rotates in the reverse direction at a low rotational speed, a centrifugal force acting on the plurality of the clutch weights 56 becomes smaller, so that the centrifugal clutch 41 is OFF. Since the centrifugal clutch 41 is OFF and the motor torque is not transmitted to the valve 9, the valve 9 remains to be fully opened. Next, an air stream is, as shown in FIG. 23, generated by reverse rotation of the impeller 6. The air stream runs from the airflow path 63 to the air duct 51 via the first valve bore 96, the airflow path 61, the pump discharge opening 54 and the pump chamber 52 in that order.

Next, the ECU 10 detects a pressure in the airflow path 61 by using the pressure sensor 29 in this condition and compares the reference pressure Pref) stored in the memory with the pressure (P) in the airflow path 61 to make leak determination (step S18). Herein, the ECU 10 determines that there is no leakage when P<Pref and that there is leakage when P>Pref. In a case it is determined that there is the leakage, a warning lamp turns on to let a driver to know it. Next, the ECU 10 rotates the motor shaft 5 in the reverse direction at a high rotational speed as shown in a timing chart in FIG. 21 (step S19). Since the motor shaft 5 rotates in the reverse direction at a high rotational speed at this point, the centrifugal force acts on the plurality of the clutch weights 56, so that the centrifugal clutch 41 is ON (complete clutch). Next, the valve is driven and closed by ON of the centrifugal clutch 41, thereby closing the first valve bore 96 and opening the second valve bore 97 (fully closed condition of the valve 9).

Next, the ECU 10 detects the fully closed condition of the valve 9 by the contact type sensor, the non-contact type position sensor or the like (full-closing valve detecting means: step S20). Thereafter, as shown in a timing chart in FIG. 21, supply of electric power to the electric motor 4 stops (step S21). In this way, the leak check in the closed space of the evaporation fuel treatment system ends. Herein, in the ninth embodiment, when the motor shaft 5 is rotated in the forward direction, the pump positive pressure is provided to the inside of the electric air pump 3. When the motor shaft 5 is rotated in the reverse direction, the pump vacuum is provided to the inside of the electric air pump 3. However, the following relation may be used. That is, when the motor shaft 5 is rotated in the forward direction, the pump vacuum is provided to the inside of the electric air pump 3. When the motor shaft 5 is rotated in the reverse direction, the pump positive pressure is provided to the inside of the electric air pump 3.

As described above, since the purge operation and the leak check operation can be carried out by a single impeller 6 in the electric air pump unit 1 of the ninth embodiment, it is possible to perform downsizing of the entire evaporation fuel treatment system, thus improving mount-properties to an engine room for a vehicle such as an automobile. In addition, the air-opening bore of the canister 15 can be closed by maintaining the closed condition of the valve 9 at the leak check operation time, thereby making it possible to eliminate the canister opening/closing valve 19. Therefore, it is possible to perform reduction in the number of components and in assembly labors, enabling reduction in costs of the entire evaporation fuel treatment system.

Since the electric motor 4, the impeller 6, the motion-direction conversion mechanism 7 and the valve 9 are united, the opening action of the valve 9 can start in a short time after supply of electric power to the electric motor 4 starts, that is, the rotational action of the impeller 6 starts. In this way, it is possible to reduce a response time from when electric power is supplied to the electric motor 4 to when the valve 9 opens (for example, the valve 9 becomes in a fully opened condition). Therefore, the control responsiveness of the valve 9 can be improved. Since the electric motor 4, the impeller 6, the motion-direction conversion mechanism 7 and the valve 9 are united, the weight of the entire electric air pump unit 1 can be reduced. Therefore, the mount-properties to an engine room for a vehicle such as an automobile can be improved and also it is possible to perform reduction in the number of components and in assembly labors.

Herein, the closed space of the evaporation fuel treatment system includes a closed space from the fuel tank 13 via the airflow pipe 14, the canister 15 and the airflow pipe 16 to the purge VSV 20 and a closed space from the electric air pump unit 1 via the air-opening pipe 17, the canister 15 and the airflow pipe 16 to the purge VSV 20, which is a space in the upper stream of the airflow direction from the purge VSV 20.

Tenth Embodiment

Figure 24:
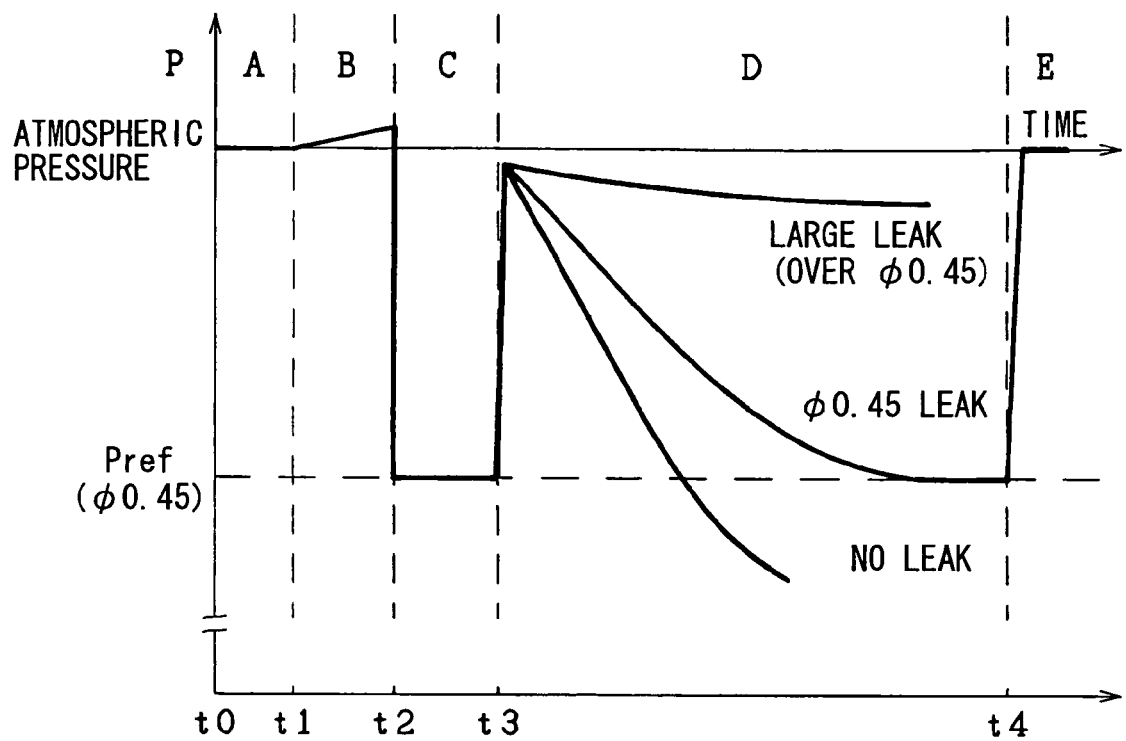
FIG. 24 is a timing chart showing a leak determination operation of an evaporation fuel treatment system in a tenth embodiment of the present invention.
Figure 25A:
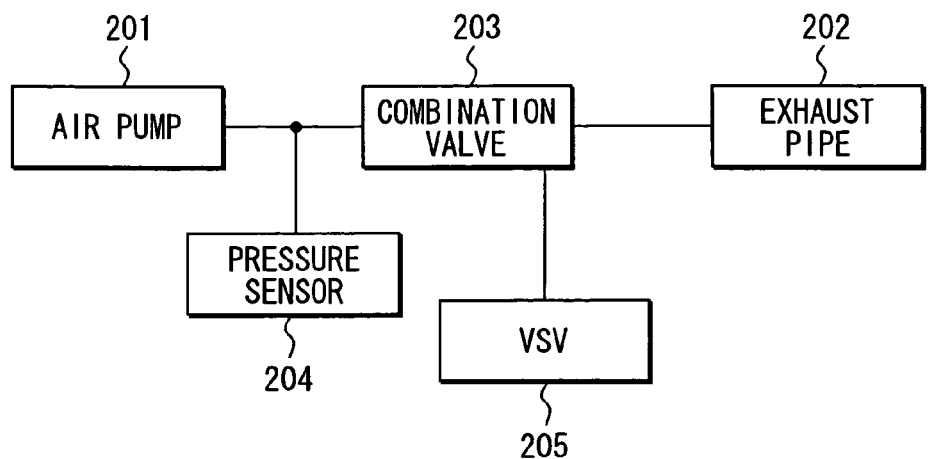
FIG. 25A is a block diagram showing a schematic arrangement of a conventional secondary air supply system.
Figure 25B:
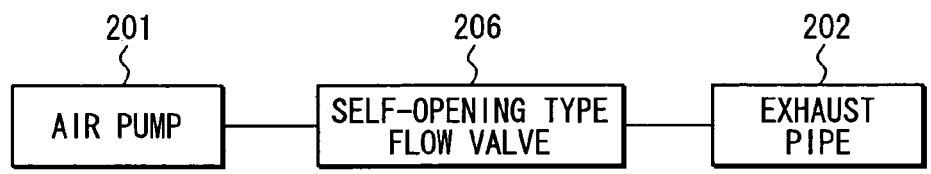
FIG. 25B is a block diagram showing a schematic arrangement of a conventional secondary air supply system.
Figure 26:
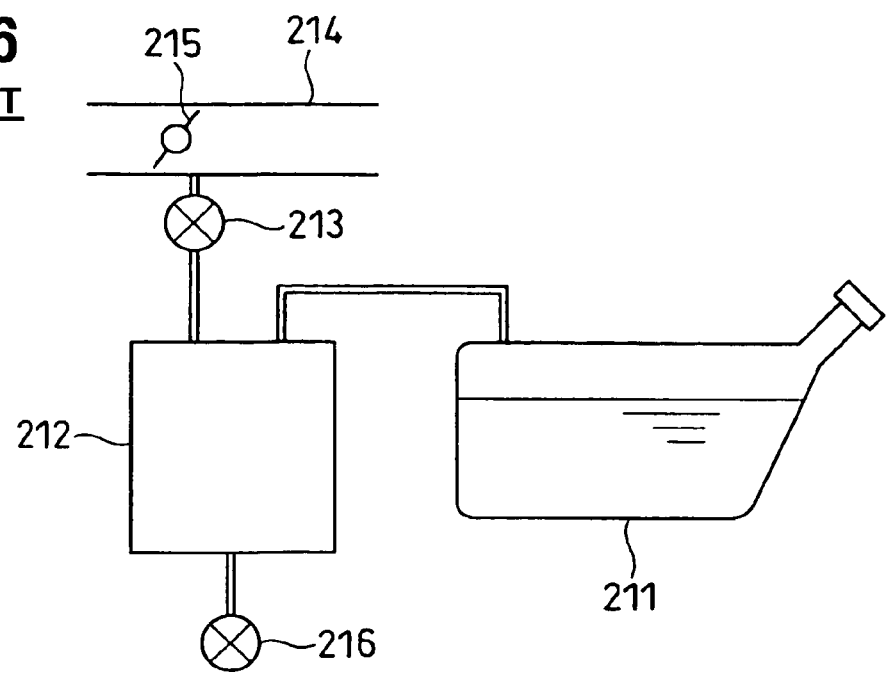
FIG. 26 is a block diagram showing a schematic arrangement of a conventional evaporation fuel treatment system.

FIG. 24 shows a tenth embodiment of the present invention. FIG. 24 is a timing chart showing a method of performing leak check in the closed space of the evaporation fuel treatment system.

In the tenth embodiment, after the ignition switch is OFF, the leak check is performed at a point when a predetermined condition is met. For example, the leak check is performed when a predetermined time (for example, five hours) elapses after the engine stops. This can be made in a case where supply of electric power to the microcomputer continues to be made after the ignition switch is OFF. First, the ECU 10 measures an atmospheric pressure (for example, 60 to 110 kPa) by using the pressure sensor 29 during a period (time A) between time t0 and time t1 in FIG. 24, that is, when the impeller 6 is OFF and also when the valve 9 is in a fully closed condition.

Next, the ECU 10 rotates the motor shaft 5 in the forward direction at a high rotational speed during a period (time B) between time t1 and time t2 in FIG. 24. When the valve 9 is in a fully opened condition, the ECU 10 stops supply of electric power to electric motor 4 and measures a pressure (P) in the airflow path 61 by using the pressure sensor 29, thus checking a volatile condition of the evaporation fuel in the fuel tank 13. For example, when the evaporation fuel in the fuel tank 13 is evaporated, an inner pressure in the closed space of the evaporation fuel treatment system is greater than an atmospheric pressure. After the checking, the ECU 10 rotates the motor shaft 5 in the reverse direction at a high rotational speed, fully closing the valve 9.

Next, the ECU 10 rotates the motor shaft 5 in the reverse direction at a low rotational speed during a period (time C) between time t2 and time t3 in FIG. 24. The ECU 10 maintains the valve 9 in the fully closed condition and at the same time, provides the pump vacuum to the inside of the electric air pump unit 1. Next, the ECU 10 detects a pressure (P) in the airflow path 61 by the pressure sensor 29 in this condition. The ECU 10 sets a reference pressure (Pref) corresponding to the reference orifice 39 having a diameter of, for example, 0.45 mm and stores the reference pressure (Pref) in the memory.

Next, the ECU 10 rotates the motor shaft 5 in the forward direction at a high rotational speed during a period (time D) between time t3 and time t4 in FIG. 24. When the valve 9 is in a fully opened condition, the ECU 10 rotates the motor shaft 5 in the reverse direction at a low rotational speed, maintaining the fully opened condition of the valve 9. Next, the ECU 10 detects a pressure (P) in the airflow path 61 by using the pressure sensor 29 in this condition. The ECU 10 determines that there is no leakage when P<Pref and that there is leakage when P>Pref. In a case it is determined that there is the leakage, a warning lamp turns on to let a driver to know it.

Next, after the leak determination is completed (time E), the ECU 10 rotates the motor shaft 5 in the reverse direction at a high rotational speed to close the valve 9. Hereby, the leak check in the close space of the evaporation fuel treatment system ends. At this point, an atmospheric pressure (for example, 60 to 110 kPa) is measured by using the pressure sensor 29, establishing the leak determination. However, the measurement of the atmospheric pressure (for example, 60 to 110 kPa) may not necessary.

Modification

In the tenth embodiment, the electric air pump 3 and the self-opened type valve 9 are integrally formed to define the electric air pump unit 1, but the electric air pump 3 and the self-closed type flow path opening/closing valve 9 may be integrally formed to define the electric air pump unit 1. In this case, the coil spring 43 is valve urging means to urge the flow path opening/closing valve in the opened direction. Valve urging means such as a rubber resilient body, an air cushion, a leaf spring and the like may be used instead of the coil spring serving as the valve urging means for urging the flow path opening/closing valve in the closing direction or the opening direction. The centrifugal clutch 41, the torque limiter 42, the motion-direction conversion mechanism 7, the valve shaft 8 and the valve 9 may be at a position out of a rotational center axis (co-axis) of the motor shaft 5.

In the tenth embodiment, the electric air pump unit 1 is connected to the upper stream end of the secondary airflow direction of the secondary airflow pipe 2 introducing secondary air into the engine exhaust pipe 21 communicated with the combustion chamber of the engine E, but the electric air pump unit 1 may be disposed in the half way of the secondary airflow pipe 2 or may be connected directly to the joining part of the engine exhaust pipe 21. In this case, the airflow pipe is the engine exhaust pipe 21 and the airflow path is the exhaust passage. In the tenth embodiment, the electric air pump unit 1 is connected to the half way of the airflow pipe 16 connecting the engine intake pipe 11 communicated with the combustion chamber of the engine E to the canister 15, but may be directly connected to the joining part of the engine intake pipe 11 or the outlet port of the canister 15.

In the tenth embodiment, the electric air pump unit 1 is connected to the upper stream end of the secondary airflow direction of the air-opening pipe (second air-opening pipe) 18 connected to the second air opening bore of the canister 15, but may be connected to the half way of the air-opening pipe (second air-opening pipe) 18 or may be connected directly to the second air opening bore of the canister 15. In the tenth embodiment, the electric air pump unit 1 is connected to the upper stream end of the secondary airflow direction of the air-opening pipe 17 connected to the air opening bore of the canister 15, but may be connected to the half way of the air-opening pipe 17 or may be connected directly to the air opening bore of the canister 15

In the tenth embodiment, the impeller 6 is assembled directly to the motor shaft 5, but the motor shaft 5 and the rotational shaft of the impeller 6 may be separately formed. A reduction device may be located between the motor shaft 5 and the rotational shaft of the impeller 6 for reducing a motor rotational speed in a predetermined reduction ratio. A reduction device may be located between the rotational shaft of the impeller 6 and the centrifugal clutch 41, the torque limiter 42 or the motion-direction conversion mechanism 7 for reducing a pump rotational speed in a predetermined reduction ratio. The rotary motion of the electric air pump 3 may be converted into a swing motion by the motion-direction conversion mechanism 7.

While only the selected preferred embodiments have been chosen to illustrate the present invention, it will be apparent to those skilled in the art from this disclosure that various changes and modifications can be made therein without departing from the scope of the invention as defined in the appended claims. Furthermore, the foregoing description of the preferred embodiments according to the present invention is provided for illustration only, and not for the purpose of limiting the invention as defined by the appended claims and their equivalents.

What is claimed is:

1. An electric air pump apparatus, comprising:
    an airflow pipe including an airflow path communicated with an internal combustion engine;
    an electric air pump for generating an air stream in the airflow path of the airflow pipe;
    a motion-direction conversion mechanism for converting a rotary motion of the electric air pump into a linear motion or a swing motion; and
    a flow path opening/closing valve which is opened or closed by the linear motion or the swing motion of the motion-direction conversion mechanism to open/close the airflow path of the airflow pipe, wherein:
    the motion-direction conversion mechanism includes:
    a slider shaft movably disposed in an axial direction to perform a rotary motion integrally with the electric air pump;
    a slide rotor movably disposed in an axial direction to perform a rotary motion integrally with the slide shaft;
    a weight for providing a linear motion to the rotary motion of the slide rotor and also a linear motion in an axial direction to the slide shaft with a centrifugal force developed by the rotary motion of the slide rotor; and
    a rolling bearing which rotatably supports the slide shaft and the slide rotor around each axis, and performs a linear motion integrally with the flow path opening/closing valve, the slide shaft and the slide rotor, wherein:
    the rolling bearing includes an inner race and an outer race, one of the inner race and the outer race being fixed to the slide shaft or the slide rotor, and the other one of the inner race and the outer race being fixed to the flow path opening/closing valve.

2. The electric air pump apparatus according to claim 1, further comprising:
    a centrifugal clutch located between the electric air pump and the motion-direction conversion mechanism for connecting/disconnecting transmission of torque from the electric air pump to the motion-direction conversion mechanism; and
    a torque limiter located between the electric air pump and the motion-direction conversion mechanism for connecting/disconnecting transmission of torque from the electric air pump to the motion-direction conversion mechanism, the centrifugal clutch being in series with the torque limiter.

3. The electric air pump apparatus according to claim 1, further comprising:
    a pump unit formed of at least the electric air pump, the motion-direction conversion mechanism and the flow path opening/closing valve, wherein:
    the pump unit is incorporated in a secondary air supply system which introduces secondary air into an exhaust pipe of the internal combustion engine for activating a catalyst of an exhaust emission control device, by the air stream generated by the rotary motion of the electric air pump.

4. The electric air pump apparatus according to claim 1, wherein:
    the electric air pump comprises:
    an electric motor including a motor shaft which rotates by supply of electric power; and
    a pump impeller rotated by the rotary motion of the motor shaft.

5. An electric air pump apparatus, comprising:
    an airflow pipe including an airflow path communicated with an internal combustion engine;
    an electric air pump for generating an air stream in the airflow path of the airflow pipe;
    a motion-direction conversion mechanism for converting a rotary motion of the electric air pump into a linear motion or a swing motion; and
    a flow path opening/closing valve which is opened or closed by the linear motion or the swing motion of the motion-direction conversion mechanism to open/close the airflow path of the airflow pipe, wherein:
    the motion-direction conversion mechanism includes:
    a slide shaft movably disposed in an axial direction;
    a slide rotor movably disposed in an axial direction to perform a rotary motion integrally with the slide shaft;
    a weight for providing a linear motion to the rotary motion of the slide rotor and also a linear motion in an axial direction to the slide shaft with a centrifugal force developed by the rotary motion of the slide rotor; and a rolling bearing which rotatably supports the slide rotor around an axis, and performs a linear motion integrally with the flow path opening/closing valve, the slide shaft and the slide rotor, wherein:

the rolling bearing includes an inner race and an outer race, one of the inner race and the outer race being fixed to the slide shaft or the slide rotor, and the other one of the inner race and the outer race being fixed to the flow path opening/closing valve.

* * * * *